United States Patent
Ikebe

(10) Patent No.: US 7,872,720 B2
(45) Date of Patent: Jan. 18, 2011

(54) LIQUID CRYSTAL DEVICE AND PROJECTOR

(75) Inventor: Tomo Ikebe, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 157 days.

(21) Appl. No.: 12/027,743

(22) Filed: Feb. 7, 2008

(65) Prior Publication Data

US 2008/0211974 A1  Sep. 4, 2008

(30) Foreign Application Priority Data

Mar. 1, 2007 (JP) .............................. 2007-051229
Mar. 1, 2007 (JP) .............................. 2007-051230
Oct. 1, 2007 (JP) .............................. 2007-257185

(51) Int. Cl.
*G02F 1/1343* (2006.01)
*G02F 1/136* (2006.01)

(52) U.S. Cl. .......................................... 349/139; 349/46
(58) Field of Classification Search ................. 349/139, 349/46

See application file for complete search history.

(56) References Cited

U.S. PATENT DOCUMENTS

| | | | | |
|---|---|---|---|---|
| 5,532,615 | A * | 7/1996 | Kondo et al. ................ | 324/770 |
| 6,341,003 | B1 * | 1/2002 | Ashizawa et al. .......... | 349/141 |
| 6,545,736 | B2 * | 4/2003 | Ashizawa et al. .......... | 349/141 |
| 6,590,550 | B2 * | 7/2003 | Nakayama et al. ............ | 345/87 |
| 6,697,142 | B2 * | 2/2004 | Ashizawa et al. .......... | 349/141 |
| 7,002,656 | B2 * | 2/2006 | Lee ............................. | 349/141 |
| 7,006,188 | B2 * | 2/2006 | Lee et al. .................... | 349/141 |
| 7,088,402 | B2 * | 8/2006 | Ochiai et al. .................. | 349/39 |
| 7,202,928 | B2 * | 4/2007 | Lee et al. .................... | 349/141 |
| 2002/0057412 | A1 * | 5/2002 | Ashizawa et al. .......... | 349/143 |
| 2002/0118330 | A1 * | 8/2002 | Lee ............................. | 349/141 |
| 2003/0090599 | A1 * | 5/2003 | Ochiai et al. .................. | 349/39 |
| 2003/0133066 | A1 * | 7/2003 | Ono et al. .................... | 349/141 |
| 2003/0202148 | A1 * | 10/2003 | Ashizawa et al. .......... | 349/139 |
| 2004/0156005 | A1 * | 8/2004 | Lee ............................. | 349/141 |
| 2004/0160563 | A1 * | 8/2004 | Ashizawa et al. .......... | 349/141 |
| 2004/0169991 | A1 * | 9/2004 | Nagata et al. ............ | 361/301.1 |
| 2004/0246425 | A1 * | 12/2004 | Ootsu et al. ................ | 349/139 |
| 2005/0083466 | A1 * | 4/2005 | Lee et al. .................... | 349/141 |
| 2005/0094078 | A1 * | 5/2005 | Kang ......................... | 349/141 |
| 2005/0128407 | A1 * | 6/2005 | Lee et al. .................... | 349/141 |
| 2005/0128408 | A1 * | 6/2005 | Lee ............................. | 349/141 |
| 2005/0128409 | A1 * | 6/2005 | Lee ............................. | 349/141 |
| 2005/0168666 | A1 * | 8/2005 | Kawasaki .................... | 349/43 |
| 2005/0275784 | A1 * | 12/2005 | Ashizawa et al. .......... | 349/141 |
| 2005/0280748 | A1 * | 12/2005 | Ochiai et al. .................. | 349/43 |
| 2006/0274250 | A1 * | 12/2006 | Ono et al. .................... | 349/141 |
| 2007/0146607 | A1 * | 6/2007 | Lee et al. .................... | 349/141 |
| 2008/0218669 | A1 * | 9/2008 | Nishimura et al. .......... | 349/110 |
| 2009/0147202 | A1 * | 6/2009 | Ashizawa et al. .......... | 349/139 |

* cited by examiner

FOREIGN PATENT DOCUMENTS

JP    A 9-258242    10/1997

*Primary Examiner*—K. Cyrus Kianni
(74) *Attorney, Agent, or Firm*—Oliff & Berridge, PLC

(57) ABSTRACT

A liquid crystal device includes a pair of substrates facing each other, and a liquid crystal layer sandwiched between the pair of substrates. One of the pair of substrates includes data lines and scanning lines that intersect each other, pixels arranged in a matrix, at least one first electrode, and at least one second electrode that applies an electric field generated between the first electrode and the second electrode to the liquid crystal layer. Each of the first electrode and the second electrode includes a plurality of electrode portions, and a joint portion for connecting the plurality of electrodes. At least a portion of the joint portion of the first electrode and at least a portion of the joint portion of the second electrode are arranged so as to overlap at least the data lines or the scanning lines, and are aligned in a line extending along the at least the data lines or the scanning lines.

10 Claims, 14 Drawing Sheets

ELECTRODE PATTERN

TRANSMITTANCE DISTRIBUTION

ELECTRODE PATTERN

TRANSMITTANCE DISTRIBUTION

LIQUID CRYSTAL DEVICE AND PROJECTOR

BACKGROUND

1. Technical Field

The present invention relates to relates to a liquid crystal device and a projector.

2. Related Art

In existing liquid crystal display apparatuses such as twisted nematic (TN) liquid crystal display apparatuses, electrodes disposed on a pair of substrates between which a liquid crystal is sealed apply an electric field in a direction substantially vertical to a surface of the substrates to control an alignment of liquid crystal molecules to modulate a light transmittance. Recently, a method in which electrodes disposed on one of the pair of substrates apply an electric field in a direction substantially parallel to a surface of the one substrate has been available. This liquid crystal display mode is referred to as a lateral electric field or in-plane switching (IPS) mode.

As with a vertical alignment (VA) mode, the lateral electric field mode is adopted in liquid crystal panels for direct-view large television screens, and provides in-plane switching of a director of the liquid crystal molecules, thus achieving the advantage of low viewing-angle dependence. Liquid crystal light valves of projectors as well as direct-vision display apparatuses, including lateral-electric-field liquid crystal panels, have been proposed. In the lateral electric field mode, in particular, thin film transistors (hereinafter abbreviated as TFTs) are used as pixel switching elements, thereby achieving the advantage of no need for common electrodes on a counter substrate.

FIG. 15 is a plan view of a pixel, showing an example of a lateral-electric-field liquid crystal device of the related art. In the liquid crystal device of the related art, as shown in FIG. 15, a plurality of data lines 101 and a plurality of scanning lines 102 are orthogonal to each other. A TFT 103 is disposed near an intersection of each of the data lines 101 and each of the scanning lines 102. A comb-shaped pixel electrode 104 and a comb-shaped common electrode 105 are disposed so as to be interdigitated with each other, and the pixel electrode 104 is connected to the TFT 103 through a contact hole 106. The common electrode 105 is electrically connected to a common electrode line 108 through a contact hole 107. With the above structure, a potential corresponding to an image signal is applied to the pixel electrode 104 from the data line 101 via the TFT 103, and a potential common to pixels is applied to the common electrode 105 from the common electrode line 108 via the contact hole 107. As used herein, electrode portions extending in parallel to each other in each comb-shaped electrode are referred to as "strip-shaped electrode portions", and a portion for connecting the strip-shaped electrode portions is referred to as a "joint portion". The electrodes 104 and 105 include joint portions 104b and 105b arranged along the data lines 101, and strip-shaped electrode portions 104a and 105a, respectively. The strip-shaped electrode portions 104a and the strip-shaped electrode portions 105a are alternately disposed so as to face each other, and a lateral electric field is generated between the strip-shaped electrode portions 104a and the strip-shaped electrode portions 105a. A liquid crystal is driven by the lateral electric field (see, for example, JP-A-9-258242).

JP-A-9-258242 noted above describes that bus lines such as data lines and scanning lines and comb-shaped electrodes are defined on different layers so that the bus lines and the comb-shaped electrodes can overlap each other in plan view, thereby increasing the aperture ratio. However, the structure described in JP-A-9-258242 has a problem. While a uniform lateral electric field is generated in a liquid crystal layer at a position where the strip-shaped electrode portions of each of the electrodes face each other (e.g., a position surrounded by a circle A in FIG. 15) to provide normal display, it is difficult to generate a lateral electric field immediately above the joint portion of the electrode that partially overlaps the bus lines, resulting in a low light transmittance at the corresponding position during bright display. Further, a lateral electric field with various directions is generated in at a position where the strip-shaped electrode portions and the joint portion face each other (e.g., a position surrounded by a circle B in FIG. 15) to cause alignment disorder of the liquid crystal, resulting in a low light transmittance at the corresponding position during bright display. Therefore, the surface area can substantially contribute to the display is reduced and a sufficient aperture ratio of the pixels is not obtained, thus preventing bright display. The low-aperture-ratio problem becomes more serious in particular for liquid crystal devices with a smaller pixel pitch such as liquid crystal devices used for liquid crystal light valves.

SUMMARY

An advantage of some aspects of the invention is that it provides a liquid crystal device capable of ensuring a sufficient pixel aperture ratio and realizing bright display. Another advantage of some aspects of the invention is that it provides a projector with a high display quality including the liquid crystal device.

According to a first aspect of the invention, a liquid crystal device includes a pair of substrates facing each other, and a liquid crystal layer sandwiched between the pair of substrates. One of the pair of substrates includes data lines, scanning lines, the data lines and the scanning lines intersecting each other, pixels arranged in a matrix, at least one first electrode, and at least one second electrode that applies an electric field generated between the first electrode and the second electrode to the liquid crystal layer. Each of the first electrode and the second electrode includes a plurality of electrode portions, and a joint portion for connecting the plurality of electrodes portions. At least a portion of the joint portion of the first electrode and at least a portion of the joint portion of the second electrode are arranged so as to overlap one line of the data lines or the scanning lines, and are aligned in a line extending along the line.

The liquid crystal device according to the first aspect of the invention still has a difficulty with the related art. That is, a uniform lateral electric field is generated in the liquid crystal layer at a portion where the electrode portions of the first electrode and the electrode portions of the second electrode face each other, thereby providing a normal display. On the other hand, a uniform lateral electric field is not generated at a portion just above the joint portions of the first and second electrodes and a portion where the electrode portions face the joint portions, resulting in a low light transmission during bright display. According to the liquid crystal device of the first aspect of the invention, however, at least a portion of the joint portion of the first electrode and at least a portion of the joint portion of the second electrode are arranged so as to overlap at least the data lines or the scanning lines, and are aligned in a line extending along the at least the data lines or the scanning lines, thereby reducing the size of a region with a low transmittance over the related art. Therefore, the aperture ratio can be increased, and a liquid crystal device capable of achieving a bright display can be realized.

Specifically, if the electrode portions of the first and second electrodes are alternately arranged in a direction in which the data lines (or the scanning lines) extend, in order to connect the plurality of electrode portions without short-circuiting the first and second electrodes, it is necessary to arrange the first and second electrodes so that the joint portion of the first electrode and the joint portion of the second electrode are placed at positions opposite to each other with respect to the longitudinal direction of the electrode portions and the open ends of the electrode portions (opposite to the joint portion) of the first electrode can be oriented in a direction opposite to that of the second electrode. In general, as with the related art shown in FIG. 15, it is conceived that the joint portion of the first electrode (e.g., a common electrode) and the joint portion of the second electrode (e.g., a pixel electrode) are arranged side-by-side. This arrangement, however, increases the width of a region with a low transmittance and reduces the pixel aperture ratio. In the liquid crystal device of the first aspect of the invention, in contrast, instead of the side-by-side arrangement of the joint portion of the first electrode and the joint portion of the second electrode, the joint portion of the first electrode and the joint portion of the second electrode are arranged so as to overlap at least the data lines or the scanning lines and to be aligned in a line along the at least the data lines or the scanning lines, thereby significantly reducing the width of the region with a low transmittance over the related art. Therefore, the pixel aperture ratio can be improved.

According to a second aspect of the invention, a liquid crystal device includes a pair of substrates facing each other, and a liquid crystal layer sandwiched between the pair of substrates. One of the pair of substrates includes data lines, scanning lines, a first pixel group including a plurality of pixels arranged in columns, a second pixel group adjacent to the first pixel group and including a plurality of pixels arranged in columns, a plurality of first electrodes, and a plurality of second electrodes that apply an electric field generated between the first electrodes and the second electrodes to the liquid crystal layer. Each of the first electrodes includes a plurality of electrode portions, and a joint portion for connecting the plurality of electrode portions. Each of the second electrodes includes a plurality of electrode portions, and a joint portion for connecting the plurality of electrode portions. At least a portion of the joint portion of one of the second electrodes which is associated with the second pixel group is placed between the joint portions of two of the first electrodes which are associated with the first pixel group. The terms "first pixel group" and "second pixel group" mean pixel arrays each including a plurality of pixels arranged in columns. For example, a pixel array is formed of, a plurality of pixels associated with a single scanning line.

In the liquid crystal device of the second aspect of the invention, at least a portion of a joint portion of one of the second electrodes which are associated with the second pixel group is placed between joint portions of two of the first electrodes which are associated with the first pixel group, thereby reducing the size of a region with a low transmittance over the related art. Therefore, the aperture ratio car be increased, and a liquid crystal device capable of achieving a bright display can be realized.

In the liquid crystal apparatus of the second aspect of the invention, preferably, at least a portion of the joint portion of each of the first electrodes and at least a portion of the joint portion of each of the second electrodes are arranged so as to overlap a corresponding one of the data lines or the scanning lines.

In the liquid crystal device, a region where the data lines and the scanning lines are arranged is a non-opening region (light-shielded region) that does not basically contribute to the display. Therefore, at least a portion of the joint portions of the first and second electrodes is placed so as to overlap the data lines or the scanning lines, thereby minimizing the reduction of the aperture ratio.

Further, preferably, the electrode portions of the first electrode and the electrode portions of the second electrode cross obliquely to the data lines or the scanning lines.

The electrode portions of the first and second electrodes are arranged so as to cross obliquely to the data lines or the scanning lines, thereby alternately arranging the joint portions of the first electrodes and the joint portions of the second electrodes to relatively easily align at least a portion of the joint portions in a line. This is because it is necessary to place each of the electrode portions so as to correspond to a pixel and to place each of the joint portions between two adjacent pixels.

Further, the electrode portions of the first electrode may be arranged so as to extend across adjacent two of the pixels.

With the above arrangement, electrode portions of a first electrode arranged so as to extend across two adjacent pixels serve as an electrode (common electrode) common to these two pixels. Therefore, the number of electrode portions of first electrodes is not excessively increased, and a peripheral portion of the pixels can also be effectively utilized for the display, thereby further increasing the aperture ratio.

According to a third aspect of the invention, a liquid crystal device includes a pair of substrates facing each other, and a liquid crystal layer sandwiched between the pair of substrates. One of the pair of substrates includes data lines, scanning lines, the data lines and the scanning lines intersecting each other, pixels arranged in a matrix, first electrodes, second electrodes that apply an electric field generated between the first electrodes and the second electrodes to the liquid crystal layer, each of the first electrodes including a plurality of electrode portions, and a joint portion for connecting the plurality of electrode portions, each of the second electrodes including a plurality of electrode portions, and a joint portion for connecting the plurality of electrode portions, a first pixel group including a plurality of the pixels which are arranged in columns, and a second pixel group adjacent to the first pixel group and including a plurality of the pixels which are arranged in columns. The first pixel group and the second pixel group are arranged so as to be offset with respect to each other in a direction in which the pluralities of pixels of the first pixel group are arrayed. A plurality of the first electrodes and a plurality of the second electrodes which are associated with the first pixel group, and a plurality of the first electrodes and a plurality of the second electrodes which are associated with the second pixel group are arranged so as to be offset with respect to each other in the direction in which the pluralities of pixels of the first pixel group are arrayed. The joint portions of the first electrodes and the joint portions of the second electrodes, which are adjacent to each other in the direction in which the pluralities of pixels of the first pixel group are arrayed, are alternately arranged. The terms "first pixel group" and "second pixel group" mean pixel arrays each including a plurality of pixels arranged in columns. For example, a pixel array is formed of a plurality of pixels associated with a particular scanning line.

The liquid crystal device of the third aspect of the invention still has a difficulty with the related art. That is, a uniform lateral electric field is generated in the liquid crystal layer at a portion where the electrode portions of the first electrode and the electrode portions of the second electrode face each other, thereby providing a normal display. On the other hand, a uniform lateral electric field is not generated at a portion immediately above the joint portions of the first and second electrodes and a portion where the electrode portions face the joint portions, resulting in a low light transmission during bright display. According to the liquid crystal device of the third aspect of the invention, however, the first pixel group and the second pixel group are arranged so as to be offset with respect to each other in a direction in which the plurality of pixels are arrayed; a plurality of the first and second electrodes which are associated with the first pixel group, and a plurality of the first and second electrodes which are associated with the second pixel group are arranged so as to be offset with respect to each other in the direction in which the plurality of pixels are arrayed; and the joint portions of the first electrodes and the joint portions of the second electrode are alternately arranged, the first electrodes and the second electrode being adjacent to each other in the direction in which the plurality of pixels are arrayed, thereby the size of a region with a low transmittance over the related art. Therefore, the aperture ratio can be increased, and a liquid crystal device capable of achieving a bright display can be realized.

Specifically, if the electrode portions of the first and second electrodes are alternately arranged in a direction in which the data lines (or the scanning lines) extend, in order to connect the plurality of electrode portions without short-circuiting the first and second electrodes, it is necessary to arrange the first and second electrodes so that the joint portions of the first electrodes and the joint portions of the second electrodes are placed at positions opposite to each other with respect to the longitudinal direction of the electrode portions and the open ends of the electrode portions (opposite to the joint portions) of the first electrodes can be oriented in a direction opposite to that of the second electrodes. In general, as with the related art shown in FIG. 15, it is conceived that the joint portions of the first electrodes (e.g., common electrodes) and the joint portions of the second electrodes (e.g., pixel electrodes) are arranged side-by-side. This arrangement, however, increases the width of a region with a low transmittance and reduces the pixel aperture ratio. In the liquid crystal device of the third aspect of the invention, in contrast, instead of the side-by-side arrangement of the joint portions of the first electrodes and the joint portions of the second electrodes, the joint portions of the first electrodes and the joint portions of the second electrodes are alternately arranged, the first electrodes and the second electrodes being adjacent to each other in the direction in which the plurality of pixels are arrayed, thereby significantly reducing the width of the region with a low transmittance over the related art. Therefore, the pixel aperture ratio can be improved.

Further, preferably, at least a portion of the joint portions of the first electrodes and at least a portion of the joint portions of the second electrodes are arranged so as to overlap the data lines or the scanning lines.

In the liquid crystal device, a region where the data lines and the scanning lines are arranged is a non-opening region (light-shielded region) that does not basically contribute to the display. Therefore, at least a widthwise portion of the joint portions of the first and second electrodes is placed so as to overlap the data lines or the scanning lines, thereby minimizing the reduction of the aperture ratio.

Further, the liquid crystal device of the third aspect of the invention may further include a display area including the pixels arranged in a matrix, and the first pixel group and the second pixel group may be arranged so as to be inclined with respect to a horizontal direction of the display area.

With the arrangement of the liquid crystal device of the third aspect of the invention, the pixels are arranged so as to be offset with respect to each other. In this case, there is a drawback in that a straight line might be displayed obliquely when a straight line extending in the horizontal direction of the display area is displayed or when a straight line extending in the vertical direction of the display area is displayed. Accordingly, a plurality of pixels that are arranged in a direction in which scanning lines extend are arranged so as to be inclined with respect to the horizontal direction of the display area, thus preventing the straight line from being displayed obliquely.

In the liquid crystal devices of the first to third aspects of the invention, preferable structures will now be described.

Preferably, a portion of at least the joint portion of the first electrode or the joint portion of the second electrode is formed so as to narrow from the electrode portions thereof.

A portion of a joint portion of a first electrode (or a second electrode) is arranged so as to narrow from electrode portions thereof, thereby easily placing a joint portion of one of the first and second electrodes between joint portions of the other two adjacent electrodes to easily provide the design specific to the invention. Furthermore, the size of a region with a low transmittance can further be reduced, and the aperture ratio can further be increased.

Further, a plurality of the first electrodes which are adjacent in a direction in which the data lines or the scanning lines extend may be formed into a continuous electrode pattern.

With the above structure, a common potential can be stably supplied to a plurality of first electrodes.

Further, the one of the pair of substrates may further include a common potential line to which a common potential is supplied, and the first electrode and the common potential line may be electrically connected through a contact hole that is formed for each of the pixels.

With this structure, even if the first electrodes are independent for each pixel, a common potential can be supplied to the first electrodes via a common potential line without using a drawn wiring line. Since a line (such as a capacitor line) to which a common potential is supplied is effectively utilized, no other lines are required for supplying a common potential to the first electrodes. Therefore, an improvement in the aperture ratio can be achieved.

Furthermore, the structure described above in which a plurality of adjacent first electrodes is formed into a continuous electrode pattern, and the structure described above in which a first electrode and a common potential line are electrically connected through a contact hole are used in combination, thus ensuring an electrical connection using one of the connection structures if the other connection structure fails. Therefore, a high-reliability liquid crystal device with a redundant structure formed of those connection structures can be achieved.

Preferably, at least one of the first electrode and the second electrode is formed of a transparent electrically conductive material.

This structure allows a portion immediately above the first electrode and the second electrode to contribute to the display. Therefore, the aperture ratio can further be increased.

According to an aspect of the invention, a projector includes a light source, a light modulator that modulates light emitted from the light source, the light modulator including the liquid crystal device according to the invention, and a projection unit that projects the light modulated by the light modulator.

Since the liquid crystal device of the invention is used as a light modulator, a projector capable of achieving a bright image display can be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described hereinafter with reference to FIGS. 1 to 6.

A liquid crystal device according to the first embodiment is an IPS transmissive-mode liquid crystal device used for a liquid crystal light valve of a projector, by way of example.

Figure 1:
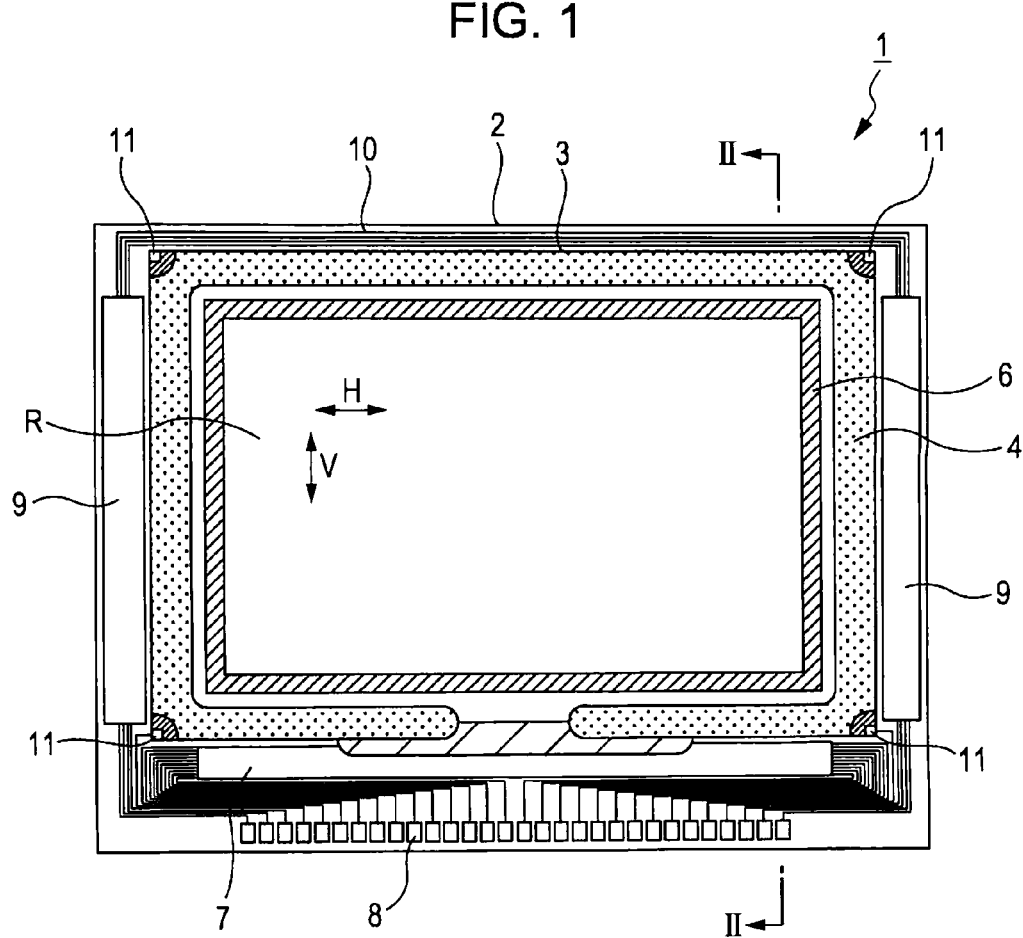
FIG. 1 is a plan view of a liquid crystal device according to a first embodiment of the invention.
Figure 2:
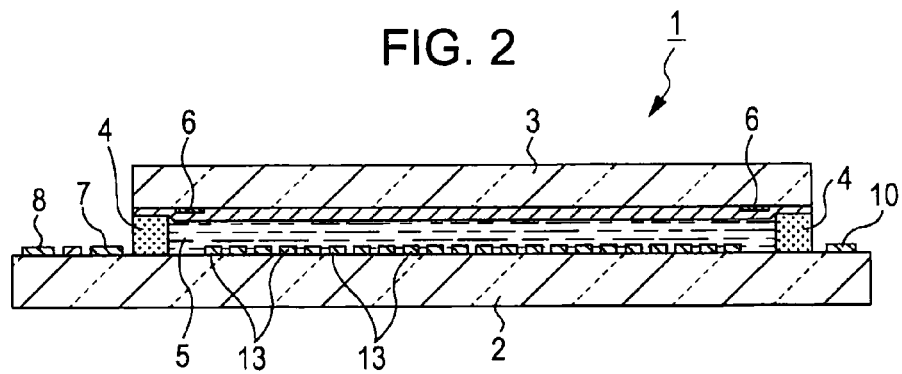
FIG. 2 is a cross-sectional view taken along a line II-II of FIG. 1.
Figure 3:
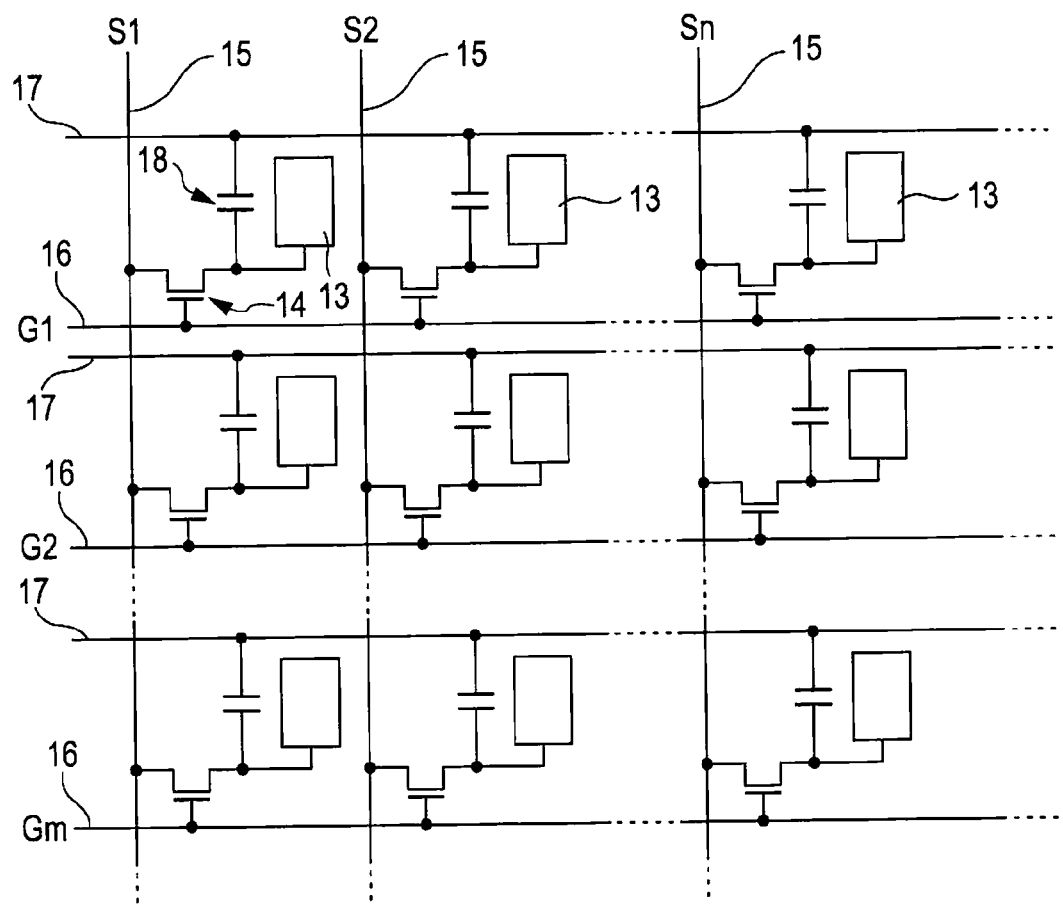
FIG. 3 is an equivalent circuit diagram of the liquid crystal device.
Figure 4:
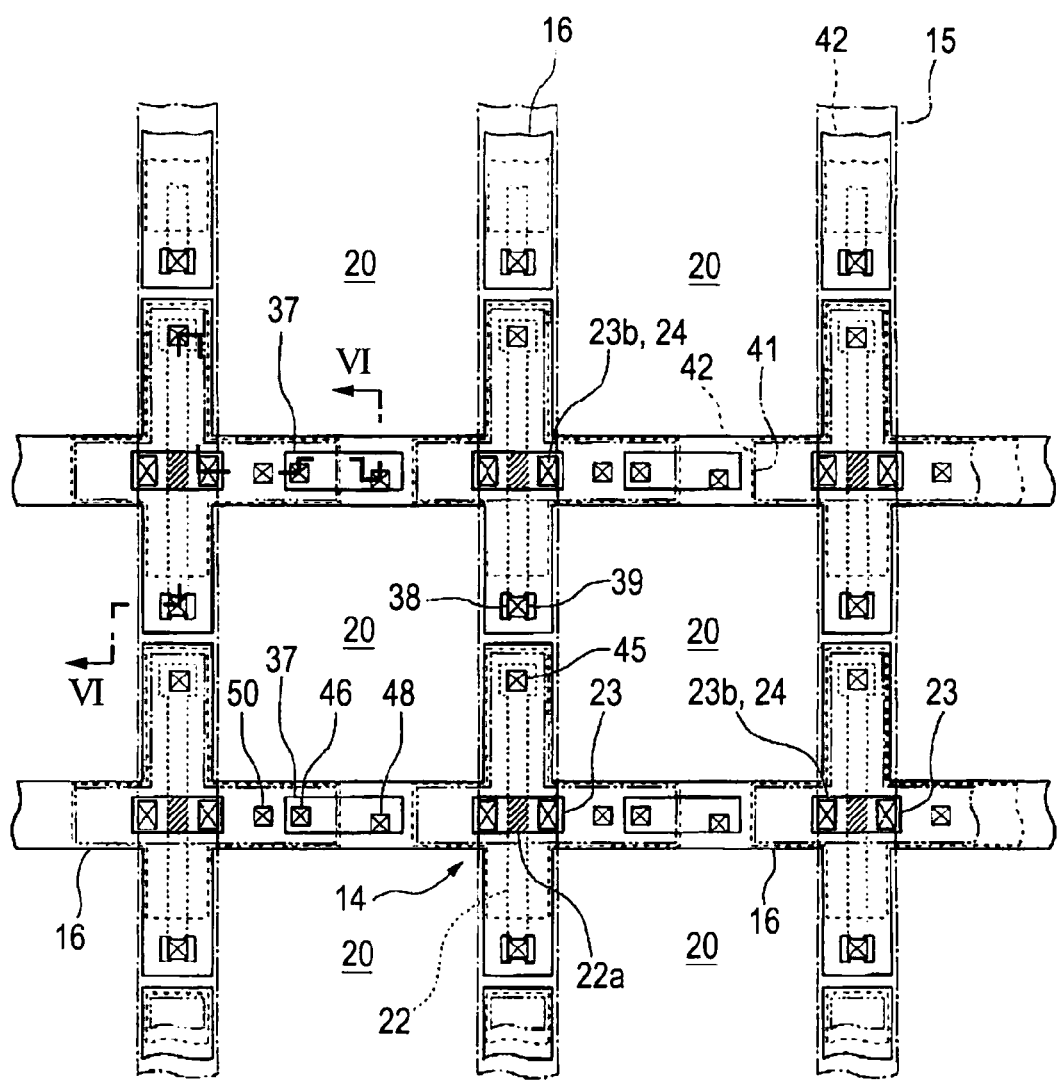
FIG. 4 is a plan view of pixels on a TFT array substrate of the liquid crystal device, showing components in lower layers thereof.
Figure 5:
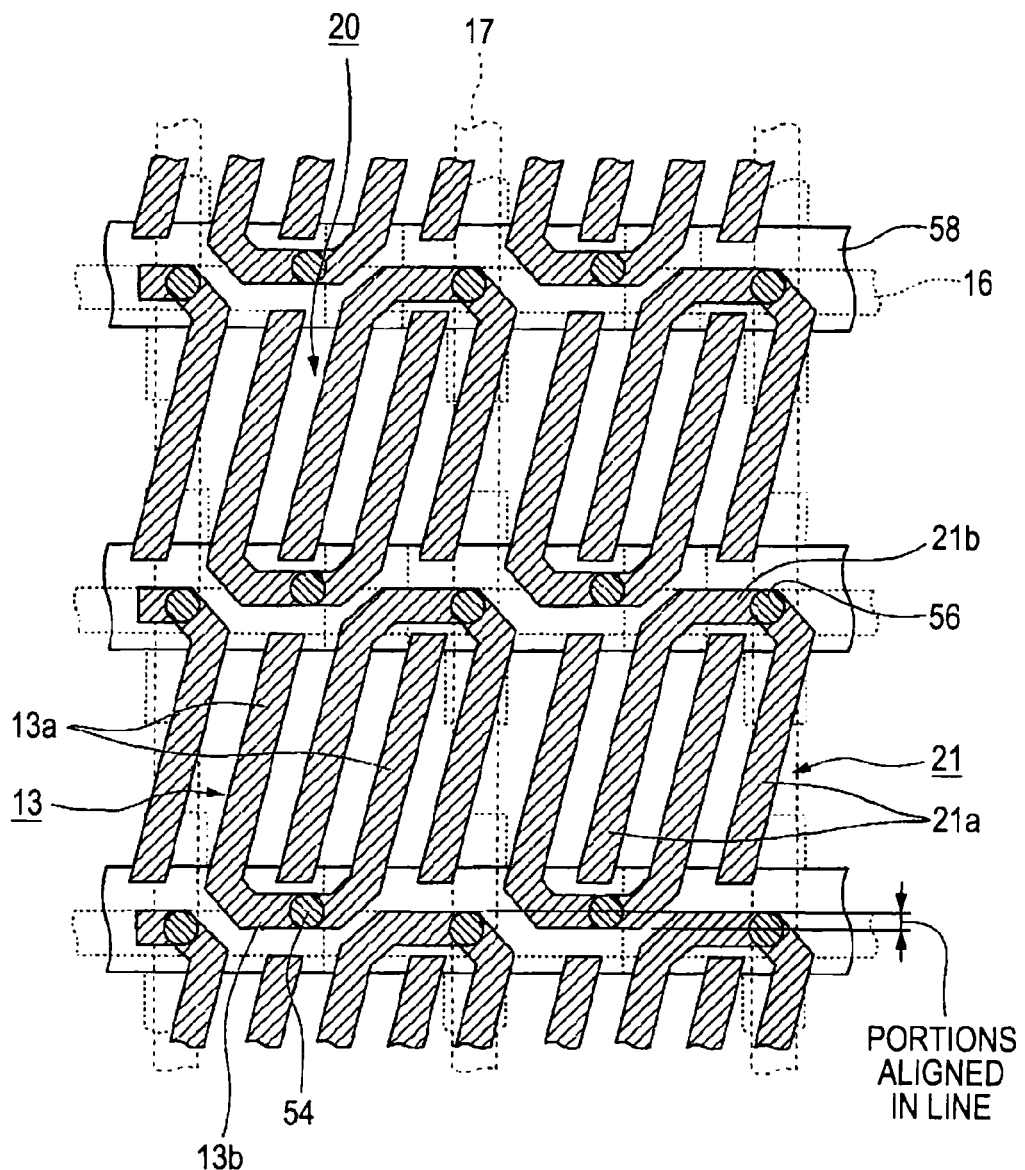
FIG. 5 is a plan view of the pixels on the TFT array substrate of the liquid crystal device, showing components in upper layers thereof.
Figure 6:
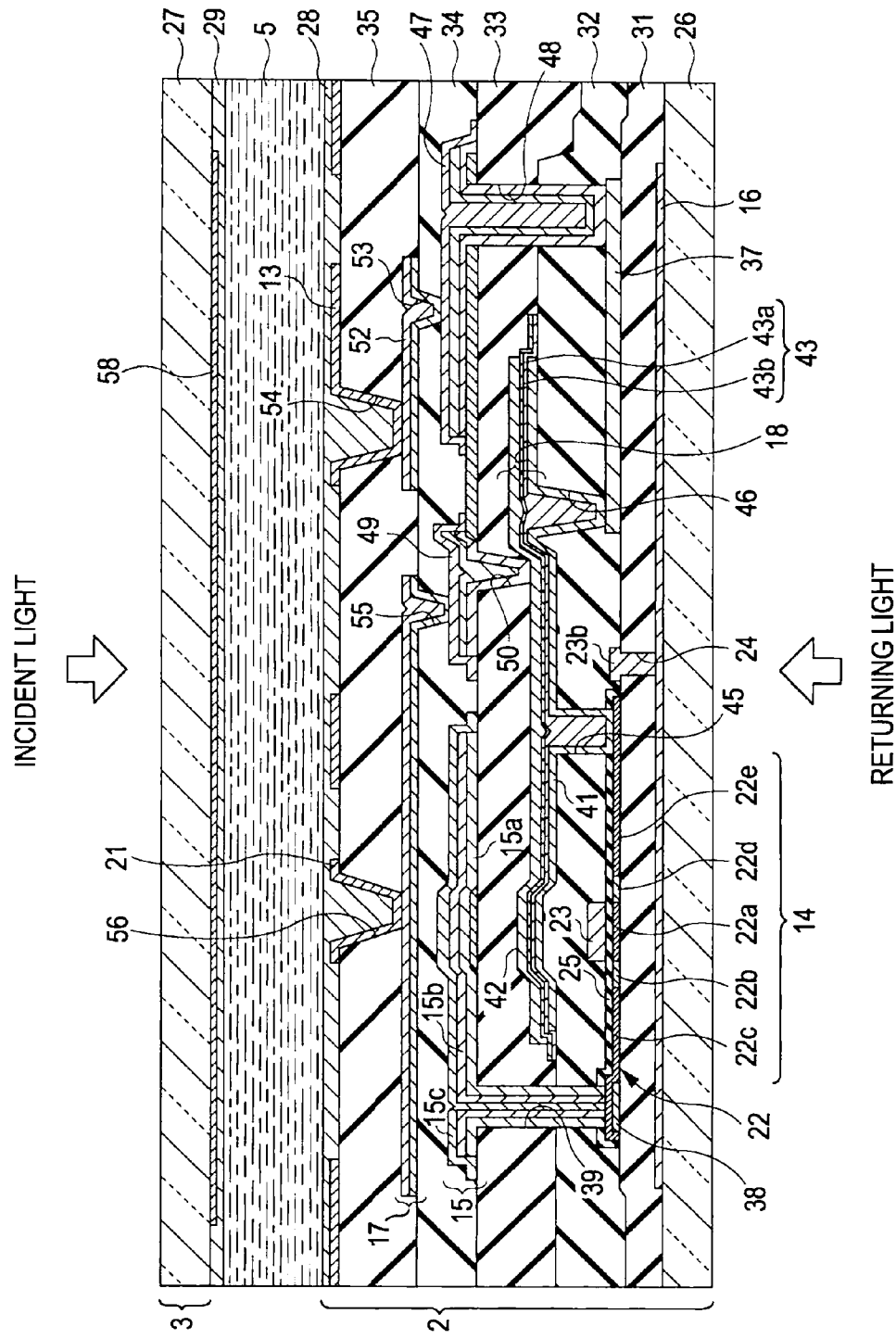
FIG. 6 is a cross-sectional view taken along a line VI-VI of FIG. 4 when the components shown in FIGS. 4 and 5 are laminated.

FIG. 1 is a plan view of a liquid crystal device 1 according to the first embodiment and components thereof, as viewed from the side of a counter substrate. FIG. 2 is a cross-sectional view of the liquid crystal device 1, taken along a line II-II of FIG. 1. FIG. 3 is an equivalent circuit diagram of the liquid crystal device 1. FIGS. 4 and 5 are plan views of a plurality of adjacent pixels on a TFT array substrate of the liquid crystal device 1. For easy illustration of components on the TFT array substrate, FIG. 4 shows only components in layers lower than layers having pixel electrodes and common electrodes, and FIG. 5 mainly shows a pattern of pixel electrodes and common electrodes. FIG. 6 is a cross-sectional view of the pixels, taken along a line VI-VI of FIG. 4 when the components shown in FIGS. 4 and 5 are laminated. In the figures used in conjunction with the following embodiments, layers and parts are illustrated in different scales so as to allow recognition of the layers and parts in the figures.

As shown in FIGS. 1 and 2, the liquid crystal device 1 of the first embodiment includes a TFT array substrate 2 and a counter substrate 3 bonded to each other by a sealant 4, and a liquid crystal layer 5 sealed in a region defined by the sealant 4. The liquid crystal layer 5 is composed of a liquid crystal material having a negative anisotropy of dielectric constant. A light-shielding film (or peripheral partition) 6 composed of a light-shielding material is disposed within the region where the sealant 4 is defined. In a peripheral circuit region outside the sealant 4, a data-line driving circuit 7 and external-circuit mounting terminals 8 are disposed along a side of the TFT array substrate 2, and scanning-line driving circuits 9 are disposed along two sides adjacent to the side. A plurality of wires 10 for connecting the scanning-line driving circuits 9 disposed on both sides of a display area R is disposed along the remaining side of the TFT array substrate 2. The counter substrate 3 includes inter-substrate conducting members 11 at the corners thereof for establishing an electrical connection between the TFT array substrate 2 and the counter substrate 3.

The horizontal and vertical directions of the display area R are represented by arrows H and V, respectively. The horizontal direction H extends along a given side of the rectangular display area R (a side extending in the lateral direction of FIG. 1), and the vertical direction V extends along a side adjacent to the given side (a side extending in the longitudinal direction of FIG. 1).

FIG. 3 is an equivalent circuit diagram of the liquid crystal device 1 of the first embodiment. The display area R of the liquid crystal device 1 includes a plurality of pixels arranged in a matrix, and each of the pixels includes a pixel electrode 13. A TFT 14, which is a pixel switching element for controlling current supply to the pixel electrode 13 is disposed beside the pixel electrode 13. A data line 15 is electrically connected to a source of the TFT element 4. Image signals S1, S2, . . . , and Sn are supplied to the data lines 15. The image signals S1, S2, . . . , and Sn may be supplied to the data lines 15 in a line sequential manner in that order, or may be supplied to a plurality of adjacent data lines 15 group by group.

A scanning line 16 is electrically connected to a gate of the TFT 14. Scanning signals G1, G2, . . . , and Gm are supplied to the scanning lines 16 at a predetermined timing in a pulsed form. The scanning signals G1, G2, . . . , and Gm are applied to the scanning lines 16 in a line sequential manner in that order. The pixel electrode 13 is electrically connected to a drain of the TFT 14. When the TFTs 14 serving as switching elements are turned on for a certain period by the scanning signals G1, G2, . . . , and Gm supplied from the scanning lines 16, the image signals S1, S2, . . . , and Sn supplied from the data lines 15 are written into the liquid crystal of the respective pixels at a predetermined timing.

The image signals S1, S2, . . . , and Sn written at a predetermined level into the liquid crystal are held for a certain period in liquid crystal capacitors defined between the pixel electrodes 13 and common electrodes, which will be described below. In order to prevent the held image signals S1, S2, . . . , and Sn from leaking, storage capacitors 18 are defined between the pixel electrodes 13 and capacitor lines 17, and are placed parallel to the liquid crystal capacitors.

When a voltage signal is applied to the liquid crystal in the manner described above, the alignment of the liquid crystal molecules changes according to the level of the voltage applied. Thus, light incident on the liquid crystal is modulated, thereby providing gradation display.

As shown in FIGS. 4 and 5, the plurality of data lines 15 and the plurality of scanning lines 16 are arranged in a lattice pattern on the TFT array substrate 2, and a plurality of pixels 20 corresponding to regions surrounded by the data lines 15 and the scanning lines 16 are placed in a matrix. The pixel electrodes 13 (second electrodes) and common electrodes 21 (first electrodes) are disposed in association with the pixels 20. As described below, each of the data lines 15 has a layered structure including an aluminum film, and each of the scanning lines 16 is formed of, for example, an electrically conductive polysilicon film. The scanning line 16 is electrically connected to a gate electrode 23 in a semiconductor layer 22, which faces a channel region 22a shown as a shaded area in FIG. 4, through a contact hole 24, and a pattern of the gate electrode 23 is included in a pattern of the scanning line 16. At an intersection between the gate electrode 23 and the data line 15 is disposed the TFT 14, which is a pixel switching element configured such that the gate electrode 23 faces the channel region 22a on the channel region 22a.

As shown in FIG. 6, the liquid crystal device 1 includes the TFT array substrate 2 and the counter substrate 3. The TFT array substrate 2 includes a substrate 26 such as a quartz substrate, a glass substrate, or a silicon substrate, and the counter substrate 3 includes a substrate 27 such as a glass substrate or a quartz substrate. On the TFT array substrate 2, the pixel electrodes 13 and the common electrodes 21 are disposed, and an alignment film 28 subjected to a predetermined alignment treatment such as a rubbing treatment is disposed above the pixel electrodes 13 and the common electrodes 21. The pixel electrodes 13 are composed of a transparent electrically conductive material such as indium tin oxide (hereinafter abbreviated as ITO). On the counter substrate 3, an alignment film 29 subject to a predetermined alignment treatment such as a rubbing treatment is disposed. A liquid crystal is filled in a space surrounded by the sealant 4 (see FIGS. 1 and 2) between the TFT array substrate 2 and the counter substrate 3 to form the liquid crystal layer 5. The liquid crystal layer 5 is configured to have an initial alignment state by the alignment films 28 and 29 under application of no electric field.

On the TFT array substrate 2, further, various components including the pixel electrodes 13, the common electrodes 21, and the alignment film 28 are defined in a layered form. In the following description, layers shown in FIG. 6 are referred to first to sixth layers from the bottom. The first layer includes the scanning lines 16. The second layer includes the gate electrodes 23, the TFTs 14, etc. The third layer includes the storage capacitors 18. The fourth layer includes the data lines 15 etc. The fifth layer includes the capacitor lines 17 etc. The sixth layer (top layer) includes the pixel electrodes 13, the common electrodes 21, the alignment layer 28, etc. A base insulating film 31 is defined between the first and second layers. A first inter-layer insulating film 32 is defined between the second and third layers, and a second inter-layer insulating film 33 is defined between the third and fourth layers. A third inter-layer insulating film 34 is defined between the fourth and fifth layers, and a fourth inter-layer insulating film 35 is defined between the fifth and sixth layers. Thus, short-circuiting between the components described above is prevented. Each of the insulating films 31, 32, 33, 34, and 35 has a contact hole or the like for electrically connecting the upper and lower electrically conductive layers. Those component elements will be described in the order from the bottom. Of the layers described above, the first to fourth layers are shown as a lower layer portion in FIG. 4, and the fifth and sixth layers are shown as an upper layer portion in FIG. 5.

Layered Structure: Configuration of First Layer including Scanning Lines, etc.

The first layer includes the scanning lines 16 composed of an elemental metal, an alloy, a metal silicide, a polysilicide, a lamination thereof, an electrically conductive polysilicon, or the like, including at least one high melting point metal such as Ti, Cr, W, Ta, or Mo. The scanning lines 16 are patterned into a stripe extending in the horizontal direction of FIG. 4, as viewed in plan view. More specifically, the stripe-patterned scanning lines 16 include main portions that extend in the horizontal direction as viewed in FIG. 4, and protruding portions that extend in the vertical direction as viewed in FIG. 4 in which the data lines 15 extend. The protruding portions that extend from the main portions of the scanning lines 16 adjacent to each other are not connected to each other. The scanning lines 16 are therefore separated from one another.

Layered Structure: Configuration of Second Layer including TFTs etc.

The second layer includes the TFTs 14 including the gate electrodes 23. Each of the TFTs 14 is formed of, for example, an n-channel TFT. The TFT 14 has a lightly doped drain (LDD) structure including, as shown in FIG. 6, the channel region 22a, a lightly doped source region 22b, a heavily doped source region 22c, a lightly doped drain region 22d, and a heavily doped drain region 22e. The semiconductor layer 22 of the TFT 14 is formed of, for example, a polysilicon film. The TFT 14 preferably has the LDD structure shown in FIG. 6, but may have an offset structure in which no impurity ions are implanted into the lightly doped source region 22b and the lightly doped drain region 22d. Alternatively, the TFT 14 may be a self-aligned TFT in which impurity ions are implanted at a high concentration using the gate electrode 23 as a mask to form a heavily doped source region and a heavily doped drain region in a self-aligned manner.

The second layer further includes first relay electrodes 37 that are composed of the same material as that of the gate electrodes 23. As shown in FIG. 4, each of the first relay electrodes 37 is formed into an island-shaped pattern so as to be located at a substantially center position of a side of a corresponding one of the pixels 20 extending in the horizontal direction thereof, as viewed in plan view. The first relay electrodes 37 and the gate electrodes 23 are formed of, for example, electrically conductive polysilicon films. On the TFT array substrate 2, a sheet layer 38 is formed below the semiconductor layer 22 of the TFT 14 and above the base insulating film 31 so as to overlie a contact hole 39, which will be described below, as viewed in plan view.

Layered Structure: Configuration of Spacing between First and Second Layers, including Base Insulating Film The base insulating film 31 which is composed of, for example, a silicon oxide film, is formed above the scanning lines 16 and below the TFTs 14 described above. The base insulating film 31 has a function for insulating the TFTs 14 from the scanning lines 16. Since the base insulating film 31 is formed over an entire surface of the substrate 26, the base insulating film 31 further has a function for preventing characteristic variation of the TFTs 14 due to the surface roughness after polishing of the substrate 26 or residual contamination after cleaning.

The base insulating film 31 includes the contact holes 24 on both sides of the semiconductor layers 22 shown in FIG. 4, as viewed in plan view. Each of the contact holes 24 is defined in a channel length direction of the semiconductor layer 22 that extends along the data line 15, and a portion of the gate electrode 23 is defined so as to fill the contact hole 24. That is, the gate electrode 23 has a sidewall portion 23b formed integrally therewith so as to extend from the gate electrode 23. Thereby, as shown in FIG. 4, the semiconductor layer 22 of the TFT 14 is covered from the lateral side as viewed in plan view to prevent light from entering from at least that side. The sidewall portion 23b is defined so as to fill the contact hole 24, and a lower end thereof is in contact with the scanning line 16. Therefore, the scanning line 16 and the gate electrode 23 are electrically connected to each other. Since the scanning lines 16 are defined in a stripe pattern as described above, the gate electrodes 23 residing on one row are always at the same potential.

Layered Structure: Configuration of Third layer including Storage capacitors, etc.

The third layer includes the storage capacitors 18. Each of the storage capacitors 18 includes a lower electrode 41 and a capacitor electrode 42 so as to face each other with a dielectric film 43 therebetween. The lower electrode 41 is electrically connected to the heavily doped drain region 22e of the TFT 14, and the capacitor electrode 42 is electrically connected to the pixel electrode 13. The storage capacitor 18 serves to significantly increase the potential retaining characteristic of the pixel electrode 13. As shown in the plan view of FIG. 4, the storage capacitor 18 of the first embodiment is defined so as not to enter the display area R (in other words, the storage capacitor 18 is defined so as to reside within a light-shielded region between the pixels 20) to ensure the display of bright images without reducing the pixel aperture ratio.

More specifically, the lower electrode 41 is formed of, for example, an electrically conductive polysilicon film and serves as a pixel-potential-side capacitor electrode. The lower electrode 41 may be composed of a single-layer film including a metal or an alloy, or a multi-layer film. In addition to the function as a pixel-potential-side capacitor electrode, the lower electrode 41 further has a function for relaying between the pixel electrode 13 and the heavily doped drain region 22e of the TFT 14. The relay connection is performed through the lower electrode 41 and the first relay electrode 37 described above.

The capacitor electrode 42 serves as a fixed-potential-side capacitor electrode of the storage capacitor 18. In the first embodiment, the capacitor line 17 that is at a fixed potential and the capacitor electrode 42 are electrically connected to each other, thereby allowing the capacitor electrode 42 to be at a fixed potential. The capacitor electrode 42 is composed of an elemental metal, an alloy, a metal silicide, a polysilicide, a lamination thereof, or a tungsten silicide, including at least one high melting point metal such as Ti, Cr, W, Ta, or Mo. Since the capacitor electrode 42 is composed of such a metal material, the capacitor electrode 42 has a function for blocking light entering the TFT 14 from above.

The dielectric film 43 has a relatively thin thickness of, for example, approximately 5 to 200 nm, and is composed of a silicon oxide film, a silicon nitride film, or the like such as a high temperature oxide (HTO) film or a low temperature oxide (LTO). In the first embodiment, the dielectric film 43 has a two-layer structure including a silicon oxide film 43a as a lower layer and a silicon nitride film 43b as an upper layer. The silicon nitride film 43b in the upper layer is patterned so as to have a larger size than that of the lower electrode 41 of the pixel-potential-side capacitor electrode, and is formed within a light-shielded region (non-opening region). While the dielectric film 43 has a two-layer structure in the first embodiment, the dielectric film 43 may have a three-layer structure including, for example, a silicon oxide film, a silicon nitride film, and a silicon oxide film, or a four-or-more-layer structure according to a situation. Alternatively, the dielectric film 43 may have a single-layer structure.

Layered Structure: Configuration of Spacing between Second and Third Layers, including First Inter-Layer Insulating Film The first inter-layer insulating film 32 is formed above the TFTs 14, the gate electrodes 23, and the first relay electrodes 37 and below the storage capacitors 18. The first inter-layer insulating film 32 is composed of a film of silicate glass such as non-doped silicate glass (NSG), phosphosilicate glass (PSG), borosilicate glass (BSG), or borophosphosilicate glass (BPSG), a silicon nitride film, or a silicon oxide film.

The first inter-layer insulating film 32 includes the contact holes 39 through which the heavily doped source regions 22c of the TFTs 14 and the data lines 15 are electrically connected. The contact holes 39 is opened so as to pass through the second inter-layer insulating film 33 and the first inter-layer insulating film 32 from a surface of the second inter-layer insulating film 33 to a surface of the semiconductor layer 22. The first inter-layer insulating film 32 further includes contact holes 45 through which the heavily doped drain regions 22e of the TFTs 14 and the lower electrodes 41 of the storage capacitors 18 are electrically connected. The first inter-layer insulating film 32 further includes contact holes 46 through which the lower electrodes 41 of the storage capacitors 13 and the first relay electrodes 37 are electrically connected. The first inter-layer insulating film 32 further includes contact holes 48 through which the first relay electrodes 37 and second relay electrodes 47, which will be described below, are electrically connected, the contact holes 48 passing through the second inter-layer insulating film 33 and the first inter-layer insulating film 32.

Layered Structure: Configuration of Fourth Layer, including Data Lines, etc.

The fourth layer includes the data lines 15. The data lines 15 are continuously formed on a surface of the second inter-layer insulating film 33 and a surface of the semiconductor layers 22 of the TFTs 14 that are exposed on a sidewall and bottom portion of the contact holes 39. As shown in FIG. 6, each of the data lines 15 has a three-layer structure including, from the bottom, an aluminum layer 15a, a titanium nitride layer 15b, and a silicon nitride layer 15c. The silicon nitride layer 15c is patterned so as to have a somewhat larger size to cover the aluminum layer 15a and titanium nitride layer 15b formed therebelow. The fourth layer further includes capacitor-line relay layers 49 and the second relay electrodes 47, which have a three-layer structure including the same materials as those of the data lines 15.

Layered Structure: Configuration of Spacing between Third and Fourth Layers, including Second Inter-Layer Insulating Film As described above, the second inter-layer insulating film 33, which is composed of a film of silicate glass such as NSG, PSG, BSG, or BPSG, a silicon nitride film, or a silicon oxide film, or the like, is formed above the storage capacitors 18 and below the data lines 15. The second inter-layer insulating film 33 has opened therein the contact holes 39 through which the heavily doped source regions 22c of the TFTs 14 and the data lines 15 are electrically connected, and the contact holes 50 through which the capacitor-line relay layers 49 and the capacitor electrodes 42 of the storage capacitors 18 are electrically connected. The second inter-layer insulating film 33 further includes the contact holes 48 through which the second relay electrodes 47 and the first relay electrodes 37 are electrically connected.

Layered Structure: Configuration of Fifth Layer including Capacitor Lines, etc.

The fifth layer includes the capacitor lines 17. The capacitor lines 17 extend from and around an image display area of the liquid crystal device 1 where the plurality of pixels are arranged. The capacitor lines 17 are electrically connected to a predetermined constant potential source, and are at a fixed potential. The fifth layer further includes third relay electrodes 52 that are composed of the same material as that of the capacitor lines 17. The third relay electrodes 52 relay an electrical connection between the second relay electrodes 47 and the pixel electrodes 13 through contact holes 53 and 54, which will be described below. The capacitor lines 17 and the third relay electrodes 52 have a two-layer structure including an aluminum layer as a lower layer and a titanium nitride layer as an upper layer.

Layered Structure: Configuration of Spacing between Fourth and Fifth Layers, including Third Inter-Layer Insulating Film The third inter-layer insulating film 34, which is composed of a film of silicate glass such as NSG, PSG, BSG, or BPSG, a silicon nitride film, a silicon oxide film, or the like, is formed above the data lines 15 and below the capacitor lines 17. The third inter-layer insulating film 34 has opened therein the contact holes 55 through which the capacitor lines 17 and the capacitor-line relay layers 49 are electrically connected, and the contact holes 53 through which the third relay electrodes 52 and the second relay electrodes 47 are electrically connected.

Layered Structure: Configuration of Sixth Layer and Spacing between Fifth and Sixth Layers, including Pixel Electrodes, Common Electrodes, etc.

The sixth layer includes the pixel electrodes 13, the common electrodes 21, and the alignment film 28 overlying the pixel electrodes 13 and the common electrodes 21. The fourth inter-layer insulating film 35, which is composed of a film of silicate glass such as NSG, PSG, BSG, or BPSG, a silicon nitride film, a silicon oxide film, or the like underlies the pixel electrodes 13 and the common electrodes 21. The fourth inter-layer insulating film 35 has opened therein the contact holes 54 through which the pixel electrodes 13 and the third relay electrodes 52 are electrically connected. That is, the contact holes 54 shown in FIG. 5 are defined in a region where the pixel electrodes 13 and the third relay electrodes 52 overlap each other. The pixel electrodes 13 and the TFTs 14 are electrically connected through the contact holed 54, the third relay electrodes 52, the contact holes 53, the second relay electrodes 47, the contact holes 48, the first relay electrodes 37, the contact holes 46, the lower electrodes 41, and the contact holes 45.

The fourth inter-layer insulating film 35 further has opened therein contact holes 56 through which the common electrodes 21 and the capacitor lines 17 (common potential lines) are electrically connected. That is, the contact holes 56 shown in FIG. 5, are defined in a region where the common electrodes 21 and the capacitor lines 17 overlap each other. Therefore, the common electrodes 21 and the capacitor lines 17 are electrically connected through the contact holes 56, and a common potential (fixed potential) is applied to the common electrodes 21 via the capacitor lines 17. In other words, since it is necessary to supply a fixed potential to the common electrodes 21, in the structure of the first embodiment, the capacitor lines 17 through which a fixed potential is supplied underlie the common electrodes 21, and a fixed potential is supplied to the common electrodes 21 using the capacitor lines 17. While in the first embodiment, a fixed potential is supplied to the common electrodes 21 using the capacitor lines 17, any line capable of supplying a fixed potential, other than the capacitor lines 17, may be used.

On the counter substrate 3, a black matrix 58 (light-shielding layer, see FIG. 5) is defined on the substrate 27 so as to extend in a direction along the scanning lines 16, and the alignment film 29 is defined so as to cover the black matrix 58. The liquid crystal device 1 of the first embodiment is an IPS liquid crystal device, and includes no electrodes for driving the liquid crystal on the counter substrate 3. While the black matrix 58 of the first embodiment is formed into a stripe so as to extend only in the direction along the scanning lines 16, the data lines 15 or capacitor lines 17 composed of a metal are defined along the data lines 15 and serve as light-shielding layers. Therefore, the four sides of each of the pixels 20 are surrounded by light-shielding films although the black matrix 58 is formed into a stripe. The alignment film 28 of the TFT array substrate 2 and the alignment film 29 of the counter substrate 3 may be organic alignment films composed of polyimide or the like. For liquid crystal light valve applications of projectors, preferably, the alignment films 28 and 29 are inorganic alignment films such as high light-resistant silicon oxide films in view of irradiation of high-brightness light.

Structure of Pixel Electrodes and Common Electrodes

Next, the structure of the pixel electrodes 13 and the common electrodes 21, which is the most significant feature of the first embodiment, will be described with reference to FIG. 5.

As shown in FIG. 5, each of the pixel electrodes 13 includes two strip-shaped electrode portions 13a (electrode portions) and a joint portion 13b for connecting the two strip-shaped electrode portions 13a, and is formed into a U shape. Although the pixel electrode 13 is segmented into portions referred to as a strip-shaped electrode portion and a joint portion, the pixel electrode 13 is actually an integrated electrode pattern composed of a transparent electrically conductive material such as ITO. The two strip-shaped electrode portions 13a extend in a direction that obliquely crosses the data lines 15 (not shown in FIG. 5) and the scanning lines 16, and are arranged parallel to each other. In the first embodiment, the angle defined between the direction in which the strip-shaped electrode portions 13a extend and the direction in which the scanning lines 16 extend (hereinafter referred to as an "extending direction of the scanning lines 16") is set to 70°. The pixel electrode 13 is configured such that lower ends of the strip-shaped electrode portions 13a, as viewed in FIG. 5, are connected to the joint portion 13b and upper ends of the strip-shaped electrode portions 13a are open.

As with the pixel electrodes 13, each of the common electrodes 21 includes two strip-shaped electrode portions 21a and a joint portion 21b for connecting the two strip-shaped electrode portions 21a, and is formed into a U shape. The common electrode 21 is also an integrated pattern composed of a transparent electrically conductive material such as ITO. The two strip-shaped electrode portions 21a extend parallel to each other so that the angle with respect to the extending direction of the scanning lines 16 is set to 70°. As opposite to the pixel electrodes 13, the common electrode 21 is configured such that upper ends of the strip-shaped electrode portions 21a, as viewed in FIG. 5, are connected to the joint portion 21b and lower ends of the strip-shaped electrode portions 21a are open. Since the pixel electrodes 13 and the common electrodes 21 are formed of a transparent electrically conductive material such as ITO, portions just above the strip-shaped electrode portions 13a and 21a of the electrodes 13 and 21 can contribute to the display to some extent. Thus, the aperture ratio is increased.

One of the strip-shaped electrode portions 21a of the common electrode 21 is placed between the two strip-shaped electrode portions 13a of the pixel electrode 13, and one of the strip-shaped electrode portions 13a of the pixel electrode 13 is placed between the two strip-shaped electrode portions 21a of the common electrode 21. That is, the U-shaped pixel electrode 13 and common electrode 21 are arranged so as to be interdigitated with each other. As viewed along the extending direction of the scanning lines 16, the strip-shaped electrode portions 13a of the pixel electrode 13 and the strip-shaped electrode portions 21a of the common electrode 21 are alternately arranged. A large proportion of the two strip-shaped electrode portions 13a of the pixel electrode 13 is located in a light-transmitted region of each of the pixels 20 where the black matrix 58 is opened. While a large proportion of one of the two strip-shaped electrode portions 21a (the strip-shaped electrode portion 21a at the left in FIG. 5) of the common electrode 21 is located in a light-transmitted region of each of the pixels 20, the other strip-shaped electrode portion 21a (the strip-shaped electrode portion 21a at the right in FIG. 5) crosses the data line 15 (not shown in FIG. 5), the capacitor line 17, etc., and extends across two of the pixels 20 which are adjacent in the extending direction of the scanning lines 16.

In the first embodiment, the open ends of the two strip-shaped electrode portions 13a of the pixel electrode 13 are oriented in a direction opposite to the open ends of the two strip-shaped electrode portions 21a of the common electrode 21. The arrangement of the joint portions 13b and 21b of the pixel electrode 13 and the common electrode 21 will be focused on. The joint portion 13b of the pixel electrode 13 and the joint portion 21b of the common electrode 21 are not arranged side-by-side in the direction in which the data lines 15 extend (hereinafter referred to as an extending direction of the data lines 15") in parallel to each other (that is, the U-shaped pixel electrode 13 and common electrode 21 are not arranged back-to-back), but instead are alternately arranged in the extending direction of the scanning lines 16 so that a portion of the joint portion 13b and a portion of the joint portion 21b are aligned in a line that extends along the scanning line 16.

In a plurality of rows adjacent to each other in the extending direction of the data lines 15, the pixel electrodes 13 in a given row (for example, the upper row of two rows of pixels show in FIG. 5) that are arranged in the extending direction of the scanning lines 16, and the pixel electrodes 13 in a row adjacent to the given row (for example, the lower row shown in FIG. 5) that are arranged in the extending direction of the scanning lines 16 are offset with respect to each other by a half pitch of the pixel electrodes 13 in the extending direction of the scanning lines 16. Likewise, the common electrodes 21 in a given row that are arranged in the extending direction of the scanning lines 16 and the common electrodes 21 in a row adjacent to the given row that are arranged in the extending direction of the scanning lines 16 are offset with respect to each other by a half pitch of the common electrodes 21 in the extending direction of the scanning lines 16. In the first embodiment, for example, the pitch of the pixels 20 is 12 μm×12 μm, the width of the strip-shaped electrode portions 13a and 21a is 1 μm (the same width for the pixel electrodes 13 and the common electrodes 21), and the pitch of the strip-shaped electrode portions 13a and 21a is 3 μm.

Now, connection portions at which the strip-shaped electrode portions 13a and the joint portion 13b of the pixel electrode 13 are connected and at which the strip-shaped electrode portions 21a and the joint portion 21b of the common electrode 21 are connected will be focused on. The strip-shaped electrode portions 13a and 21a and the joint portions 13b and 21b are not linearly bent only once at an angle of 70°, but instead have oblique portions having an obtuse angle defined between the direction in which the strip-shaped electrode portions 13a and 21a extend and the direction in which the joint portions 13b and 21b extend. In the first embodiment, by way of example, the strip-shaped electrode portions 13a and 21a and the joint portions 13b and 21b are bent twice at an angle of substantially 125°. That is, the pixel electrode 13 and the common electrode 21 are contoured so as to narrow toward the connection portions from the open ends of the strip-shaped electrode portions 13a and 21a.

Not only the positional relationship between the pixel electrodes 13 and the common electrodes 21 but also the shape of the connection portions at which the strip-shaped electrode portions 13a and 21a and the joint portions 13b and 21b are connected are appropriately determined so that the joint portion 13b of one of the pixel electrodes 13 in a given row can be placed in a space between the joint portions 21b of two of the common electrodes 21 in a row adjacent to the given row. Conversely, the joint portion 21b of one of the common electrodes 21 in a given row can be placed in a space between the joint portions 13b of two of the pixel electrodes 13 in a row adjacent to the given row. Therefore, as described above, the joint portions 13b of the pixel electrodes 13 and the joint portions 21b of the common electrodes 21 are alternately arranged in the extending direction of the scanning lines 16, and a portion of each of the joint portions 13b and a portion of each of the joint portions 21b are aligned in a line. In other words, if a plurality of pixels corresponding to one of the scanning lines 16 is referred to as a pixel group and two pixel groups adjacent in the extending direction of the data lines 15 are first and second pixel groups, respectively, at least a portion of the joint portion 13b of one of the pixel electrodes 13 which is associated with the second pixel group is placed between the joint portions 21b of two of the common electrodes 21 which are associated with the first pixel group. Further, at least a portion of the joint portion 21b of one of the common electrodes 21 which is associated with the second pixel group is placed between the joint portions 13b of two of the pixel electrodes 13 which are associated with the first pixel group.

In the liquid crystal device 1 of the first embodiment, a pair of polarizing plates (not shown) is disposed outside the TFT array substrate 2 and the counter substrate 3. The pair of polarizing plates is arranged so that polarizing axes thereof are parallel to the extending (direction of the data lines 15 or the scanning lines 16 and are orthogonal to each other (cross-Nicol arrangement). Further, the alignment direction of the alignment films 28 and 29 of the TFT array substrate 2 and the counter substrate 3 coincides with the direction of the polarizing axis of one of the polarizing plates. Therefore, the alignment direction of the liquid crystal molecules under generation of no electric field in the liquid crystal layer 5 coincides with the polarizing axis direction of the polarizing plates, and a dark (black) display (normally black mode) is obtained. When a voltage (e.g., 5 V) corresponding to an image signal is applied to the pixel electrodes 13, a lateral electric field substantially parallel to the substrate surface is applied to the liquid crystal layer 5, and the alignment of the liquid crystal molecules is rotated by a predetermined angle within a plane substantially parallel to the substrate surface.

Thereby, the light transmittance is modulated according to the angle, and a bright (white) display with a predetermined gradation level is obtained.

For example, assuming that the alignment direction of the liquid crystal molecules is parallel to the extending direction of the scanning lines 16 under application of no voltage, then, in the first embodiment, since the strip-shaped electrode portions 13a and 21a of the electrodes 13 and 21 are arranged so as to have an angle of 70° with respect to the scanning lines 16, a lateral electric field generated in a direction vertical to the strip-shaped electrode portions 13a and 21a would be inclined by 20° with respect to the scanning lines 16. In this case, the angle defined between the alignment direction of the liquid crystal molecules under application of no voltage and the direction of the lateral electric field is 20°, and the liquid crystal molecules in the liquid crystal layer 5 will be aligned in the direction parallel to the lateral electric field when the lateral electric field is applied. Therefore, no liquid crystal alignment disorder (called disclination) occurs. The structure of the first embodiment prevents display defects caused by alignment disorder, resulting in high-quality display of images even with the use of the arrangement of typical polarizing plates in which the polarizing axes of the polarizing plates are parallel to the extending direction of data lines or scanning lines.

In the liquid crystal device 1 of the first embodiment, the strip-shaped electrode portions 13a and 21a of the pixel electrodes 13 and the common electrodes 21 are arranged parallel to each other, and a uniform lateral electric field is generated in the liquid crystal layer 5 at a portion where the electrode portions 13a and 21a face each other. Thus, a normal bright display is obtained. On the other hand, a uniform lateral electric field is not generated at a portion just above the joint portions 13b and 21b of the electrodes 13 and 21 and at a portion where the strip-shaped electrode portions 13a and 21a face the joint portions 13b and 21b, resulting in a low light transmittance during bright display. According to the liquid crystal device 1 of the first embodiment, however, the joint portions 13b of the pixel electrodes 13 and the joint portions 21b of the common electrodes 21 are alternately arranged in the extending direction of the scanning lines 16, and a widthwise portion of the joint portions 13b of the pixel electrodes 13 and a widthwise portion of the joint portions 21b of the common electrodes 21 are aligned in a line, thereby reducing the size of a region with a low transmittance over the related art. Therefore, the aperture ratio can be increased. A liquid crystal device capable of achieving a bright display can thus be realized.

In the first embodiment, the joint portions 13b and 21b of the pixel electrodes 13 and the common electrodes 21 are placed so as to overlap the scanning lines 16. Since a region where the scanning lines 16 are located is a region where light is blocked by the black matrix 58, the reduction of the aperture ratio can be minimized. Further, the strip-shaped electrode portions 13a and 21a of the pixel electrodes 13 and the common electrodes 21 extend obliquely to the data lines 15 and the scanning lines 16, and the corners of the connection portions at which the strip-shaped electrode portions 13a and 21a and the joint portions 13b and 21b are connected are formed obliquely. Therefore, the joint portions of the pixel electrodes 13 or the common electrodes 21 can be relatively easily placed between the joint portions of the other electrodes. Further, since one of the strip-shaped electrode portions 21a of each of the common electrodes 21 obliquely crosses the data line 15 and extends across two of the pixels 20 which are adjacent in the extending direction of the scanning lines 16, the one strip-shaped electrode portion 21a can serve as a common electrode shared between the two pixels 20. Therefore, a peripheral portion of the pixels 20 can be effectively utilized for the display, and the aperture ratio can further be improved.

According to the first embodiment, the common electrodes 13 and the capacitor lines 17 are electrically connected through the contact holes 56. Therefore, even if the common electrodes 13 are separated for each of the pixels 20, a fixed potential can be supplied to the common electrodes 13 via the capacitor lines 17. Since the capacitor lines 17 through which a fixed potential is supplied are effectively utilized, no other lines are required for supplying a common potential. Therefore, the aperture ratio can be improved.

Second Embodiment

A second embodiment of the invention will not be described with reference to FIG. 7.

The basic structure of a liquid crystal device according to the second embodiment is similar to that of the first embodiment, except for the structure of common electrodes. Only a portion different from that of the first embodiment will be described with reference to a plan view shown in FIG. 7, and a description of the other portions, which are common to those of the first embodiment, is omitted. In FIG. 7, components common to those shown in FIG. 1 are represented by the same reference numerals.

Figure 7:
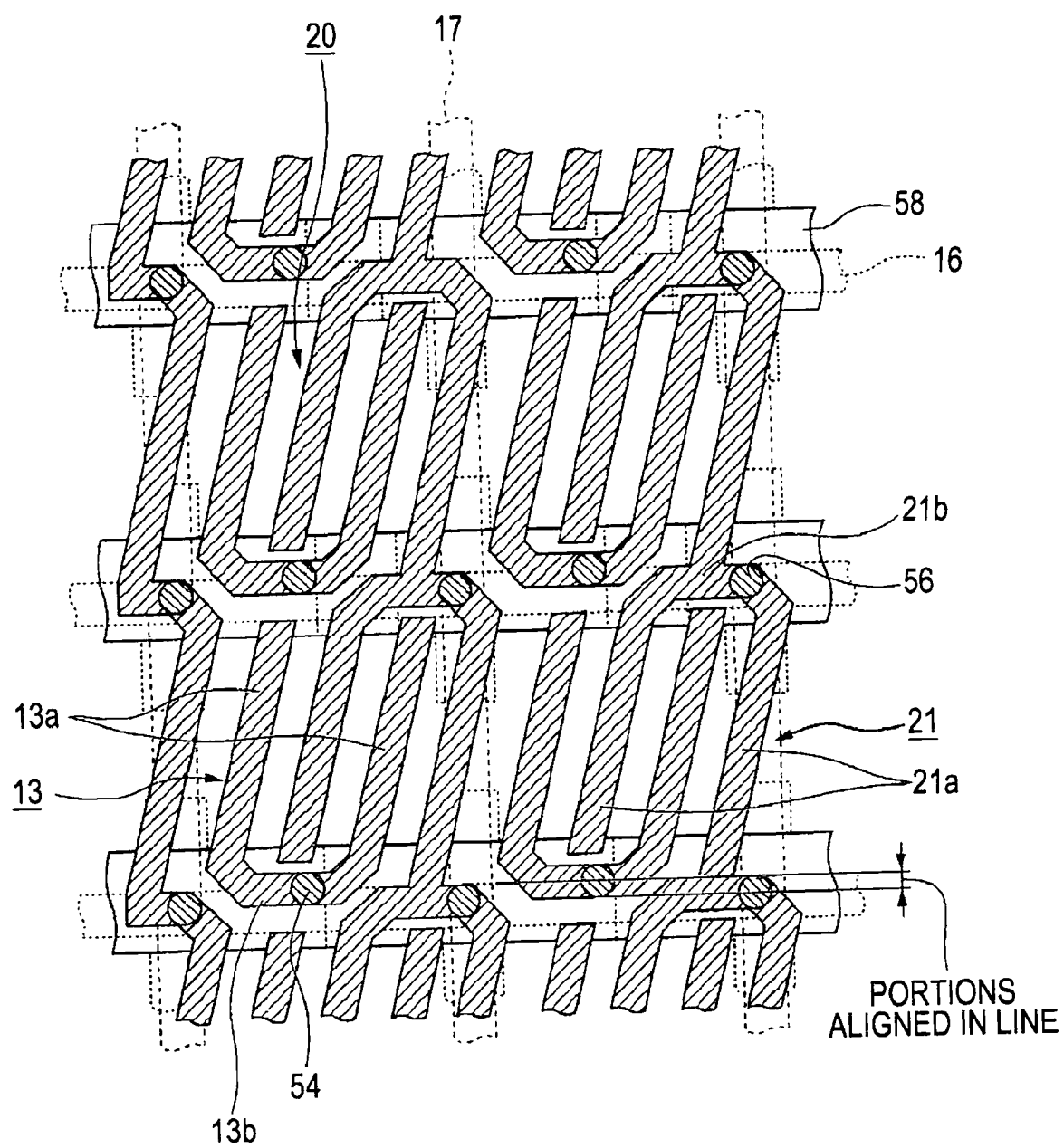
FIG. 7 is a plan view of pixels on a TFT array substrate of a liquid crystal device according to a second embodiment of the invention, showing components in upper layers thereof.

In the second embodiment, as shown in FIG. 7, one of the two strip-shaped electrode portions 21a of each of the common electrodes 21 extends from the open end thereof, and is connected to the joint portion 21b of the common electrode 21 that is adjacent thereto in the extending direction of the data lines 15. In the second embodiment, therefore, unlike the first embodiment, the common electrodes 21 are not independent for each pixel, and a plurality of the common electrodes 21 which are associated with a plurality of the pixels 20 which are arranged in the extending direction of the data lines 15 are formed into an integrated continuous electrode pattern. The electrode pattern is drawn on the TFT array substrate 2 to the outside of the image display area, and is fixed at a common potential. The remaining components, such as the pixel electrodes 13, are the same as those of the first embodiment.

According to the structure of the second embodiment, the plurality of common electrodes 21 arranged in the extending direction of the data lines 15 are electrically connected, thereby stably supplying a common potential to the plurality of common electrodes 21. In the second embodiment, in particular, the above-described structure and the structure described in the first embodiment in which the common electrodes 21 and the capacitor lines 17 are electrically connected through the contact holes 56 so that a common potential can be supplied via the capacitor lines 17 are used in combination. Therefore, even if one of the connection structures fails, the other connection structure can be used to establish an electrical connection, thereby realizing a high-reliability liquid crystal device with a redundant structure.

Third Embodiment

A third embodiment of the invention will be described with reference to FIGS. 10 and 11.

The basic structure of a liquid crystal device according to the third embodiment is similar to that of the first embodiment, except for the arrangement and shape of pixels.

Figure 10:
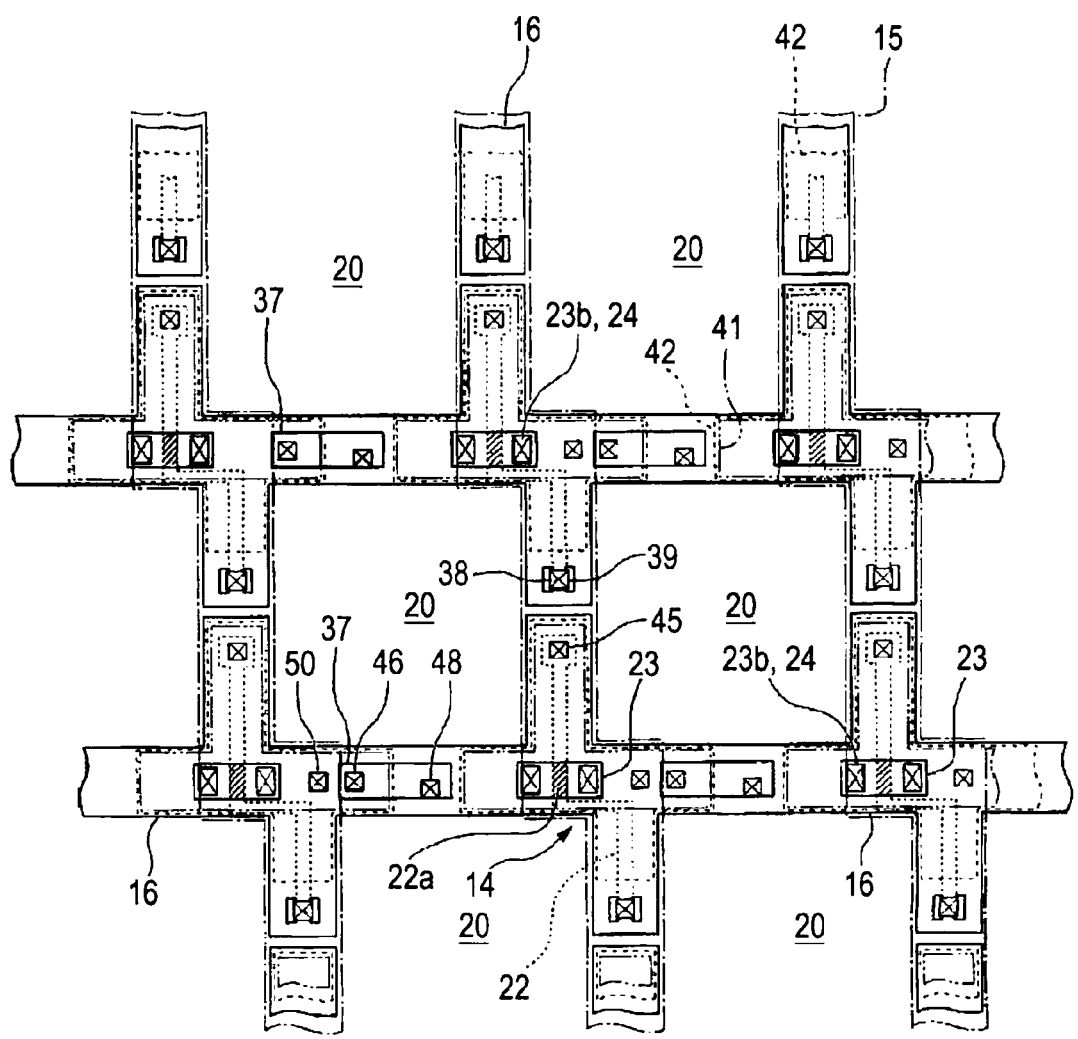
FIG. 10 is a plan view of pixels on a TFT array substrate of a liquid crystal device according to a third embodiment of the invention, showing components in lower layers thereof.
Figure 11:
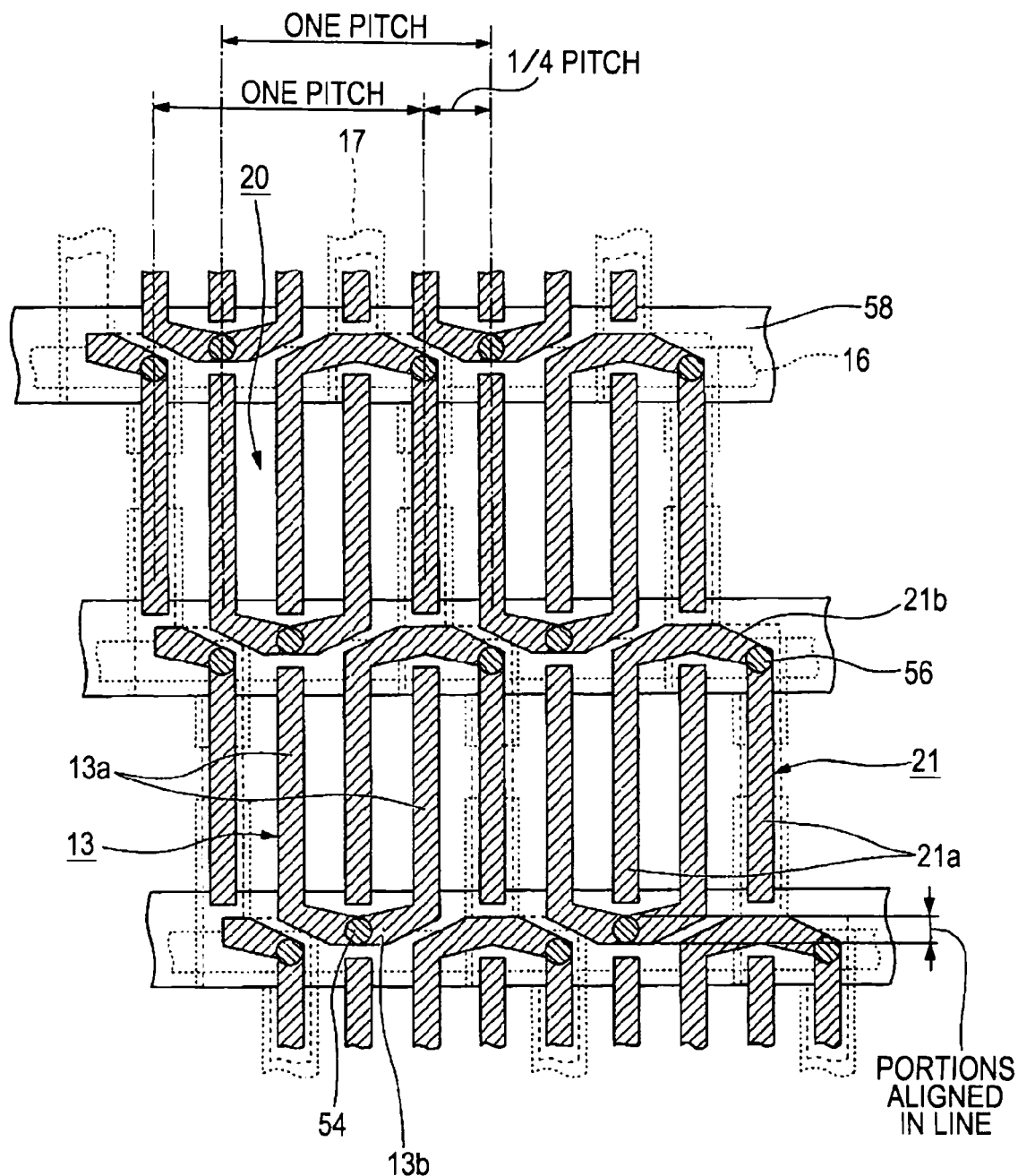
FIG. 11 is a plan view of the pixels on the TFT array substrate of the liquid crystal device, showing components in upper layers thereof.

FIGS. 10 and 11 are plan views of a plurality of adjacent pixels on a TFT array substrate of the liquid crystal device of the third embodiment. For easy illustration of components on the TFT array substrate, FIG. 10 shows only components in layers lower than layers having pixel electrodes and common electrodes, and FIG. 11 mainly shows a pattern of pixel electrodes and common electrodes.

Only a portion different from that of the first embodiment will be described with reference to the plan views shown in FIGS. 10 and 11, and a description of the other portions, which are common to those of the first embodiment, is omitted. The cross-sectional structure of the liquid crystal device is similar to that of the first embodiment. In FIGS. 10 and 11, components common to those shown in FIGS. 4 and 5 are represented by the same reference numerals.

As shown in FIGS. 10 and 11, a plurality of data lines 15 and a plurality of scanning lines 16 are arranged in a lattice pattern on a TFT array substrate 2, and a plurality of pixels 20 corresponding to regions surrounded by the data lines 15 and the scanning lines 16 are arranged in a matrix. In the third embodiment, as shown in FIG. 10, in a plurality of rows adjacent to each other in the extending direction of the data lines 15, the pixels 20 in a given row (for example, the upper row of two rows of pixels shown in FIG. 10) that are arranged in the extending direction of the scanning lines 16, and the pixels 20 in a row adjacent to the given row (for example, the lower row shown in FIG. 10) that are arranged in the extending direction of the scanning lines 16 are arranged so as to be offset with respect to each other by a substantially quarter pitch of the pixels 20 in the extending direction of the scanning lines 16. Pixel electrodes 13 (second electrodes) and common electrodes 21 (first electrodes) are disposed in each of the pixels 20 which are arranged so as to be offset with respect to each other by a quarter pitch for each row in the extending direction of the scanning lines 16. If a plurality of pixels corresponding to one of the scanning lines 16 is referred to as a pixel group and two pixel groups adjacent in the extending direction of the data lines 15 are first and second pixel groups, the first and second pixel groups are arranged so as to be offset with respect to each other in the direction in which the plurality of pixels 20 are arrayed.

Each of the data lines 15 has a layered structure including an aluminum film, etc., and each of the scanning lines 16 is composed of, for example, an electrically conductive polysilicon film. The scanning line 16 is electrically connected to a gate electrode 23 in a semiconductor layer 22, which faces a channel region 22a shown as a shaded area in FIG. 10, through a contact hole 24, and a pattern of the gate electrode 23 is included in a pattern of the scanning lines 16. A TFT 14, which is a pixel switching element configured such that the gate electrode 23 is placed on the channel region 22a so as to face the channel region 22a, is disposed at an intersection between the gate electrode 23 and the data line 15.

Structure of Pixel Electrodes and Common Electrodes

Next, the structure of the pixel electrodes 13 and the common electrodes 21, which is the most significant feature of the third embodiment, will be described with reference to FIG. 11.

As shown in FIG. 11, each of the pixel electrodes 13 includes two strip-shaped electrode portions 13a (electrode portions) and a joint portion 13b for connecting the two strip-shaped electrode portions 13a, and is formed into a U shape. Although the pixel electrode 13 is segmented into portions referred to as a strip-shaped electrode portion and a joint portion, the pixel electrode 13 is actually an integrated electrode pattern composed of a transparent electrically conductive material such as ITO. The two strip-shaped electrode portions 13a extend parallel to the data line 15 (not shown in FIG. 11), and are arranged parallel to each other. The pixel electrode 13 is configured such that lower ends of the strip-shaped electrode portions 13a, as viewed in FIG. 11, are connected to the joint portion 13b and upper ends of the strip-shaped electrode portions 13a are open.

As with the pixel electrodes 13, each of the common electrodes 21 includes two strip-shaped electrode portions 21a and a joint portion 21b for connecting the two strip-shaped electrode portions 21a, and is formed into a U shape. The common electrode 21 is also an integrated pattern composed of a transparent electrically conductive material such as ITO. The two strip-shaped electrode portions 21a extend parallel to the extending direction of the data lines 15, and extend parallel to each other. As opposite to the pixel electrodes 13, the common electrode 21 is configured such that upper ends of the strip-shaped electrode portions 21a, as viewed in FIG. 11, are connected to the joint portion 21b and lower ends of the strip-shaped electrode portions 21a are open. Since the pixel electrodes 13 and the common electrodes 21 are formed of a transparent electrically conductive material such as ITO, portions immediately above the strip-shaped electrode portions 13a and 21a of the electrodes 13 and 21 can contribute to the display to some extent. Thus, the aperture ratio is increased.

One of the strip-shaped electrode portion 21a of the common electrode 21 is placed between the two strip-shaped electrode portions 13a of the pixel electrode 13, and one of the strip-shaped electrode portions 13a of the pixel electrode 13 is placed between the two strip-shaped electrode portions 21a of the common electrode 21. That is, the U-shaped pixel electrode 13 and the common electrode 21 are arranged so as to be interdigitated with each other. As viewed along the extending direction of the scanning lines 16, the strip-shaped electrode portions 13a of the pixel electrode 13 and the strip-shaped electrode portions 21a of the common electrode 21 are alternately arranged. A large proportion of the two strip-shaped electrode portions 13a of the pixel electrode 13 is located in a light-transmitted region of each of the pixels 20 where the black matrix 58 is opened. While a large proportion of one of the two strip-shaped electrode portions 21a (the strip-shaped electrode portion 21a at the left in FIG. 11) of the common electrode 21 is located in a light-transmitted region of each of the pixels 20, the other strip-shaped electrode portion 21a (the strip-shaped electrode portion 21a at the right in FIG. 11) overlaps the data line 15 (not shown in FIG. 11), the capacitor line 17, etc., in plan view, and is located outside the light-transmitted region.

In the third embodiment, the open ends of the two strip-shaped electrode portions 13a of the pixel electrode 13 are oriented in a direction opposite to the open ends of the two strip-shaped electrode portions 21a of the common electrode 21 in association with the pixel 20. The arrangement of the joint portions 13b and 21b of the pixel electrode 13 and the common electrode 21 will be focused on. The joint portion 13b of the pixel electrode 13 and the joint portion 21b of the common electrode 21 are not arranged side-by-side in the extending direction of the data lines 15 in parallel to each other (that is, the U-shaped pixel electrode 13 and common electrode 21 are not arranged back-to-back), but instead are alternately arranged in the extending direction of the scanning lines 16 (in a direction in which a plurality of pixels constituting a pixel group are arrayed) so that a widthwise portion of the joint portion 13b and a widthwise portion of the joint portion 21b are aligned in a line. Two of the pixels 20 that are arranged side-by-side along the data lines 15 are arranged so as to be offset with respect to each other by a quarter pitch, thereby achieving the above arrangement.

In a plurality of rows adjacent to each other in the extending direction of the data lines 15, the pixel electrodes 13 in a given row (for example, the upper row of two rows of pixels shown in FIG. 11) that are arranged in the extending direction of the scanning lines 16, and the pixel electrodes 13 in a row adjacent to the given row (for example, the lower row shown in FIG. 11) that are arranged in the extending direction of the scanning lines 16 are offset with respect to each other by a quarter pitch of the pixel electrodes 13 in the extending direction of the scanning lines 16 (in a direction in which a plurality of pixels constituting a pixel group are arrayed). Likewise, the common electrodes 21 in a given row that are arranged in the extending direction of the scanning lines 16 and the common electrodes 21 in a row adjacent to the given row that are arranged in the extending direction of the scanning lines 16 are offset with respect to each other by a quarter pitch of the common electrodes 21 in the extending direction of the scanning lines 16. In the third embodiment, for example, the pitch of the pixels 20 is 12 μm×12 μm, the width of the strip-shaped electrode portions 13a and 21a is 1 μm (the same width for the pixel electrodes 13 and the common electrodes 21), and the pitch of the strip-shaped electrode portions 13a and 21a is 3 μm.

Now, connection portions at which the strip-shaped electrode portions 13a and the joint portion 13b of the pixel electrode 13 are connected and at which the strip-shaped electrode portions 21a and the joint portion 21b of the common electrode 21 are connected will be focused on. The strip-shaped electrode portions 13a and 21a and the joint portions 13b and 21b are not bent only once at a right angle, but instead have oblique portions having an obtuse angle defined between the direction in which the strip-shaped electrode portions 13a and 21a extend and the direction in which the joint portions 13b and 21b extend. In the third embodiment, by way of example, the strip-shaped electrode portions 13a and 21a and the joint portions 13b and 21b are bent twice. That is, the pixel electrode 13 and the common electrode 21 are contoured so as to narrow toward the connection portions from the open ends of the strip-shaped electrode portions 13a and 21a.

Not only the positional relationship between the pixel electrodes 13 and the common electrodes 21 but also the shape of the connection portions at which the strip-shaped electrode portions 13a and 21a and the joint portions 13b and 21b are connected are appropriately determined so that the joint portion 13b of one of the pixel electrodes 13 in a given row can be placed in a space between the joint portions 21b of two of the common electrodes 21 in a row adjacent to the given row. Conversely, the joint portion 21b of one of the common electrodes 21 in a given row can be placed in a space between the joint portions 13b of two of the pixel electrodes 13 in a row adjacent to the given row. Therefore, as described above, the joint portions 13b of the pixel electrodes 13 and the joint portions 21b of the common electrodes 21 are alternately arranged in the extending direction of the scanning lines 16, and a widthwise portion of each of the joint portions 13b and a widthwise portion of each of the joint portions 21b are aligned in a line.

In the liquid crystal device 1 of the third embodiment, a pair of polarizing plates (not shown) is disposed outside the TFT array substrate 2 and the counter substrate 3. The pair of polarizing plates is arranged so that polarizing axes thereof cross the extending direction of the data lines 15 or the scanning lines 16 and are orthogonal to each other (cross-Nicol arrangement). Further, the alignment direction of the alignment films 28 and 29 of the TFT array substrate 2 and the counter substrate 3 coincides with the direction of the polarizing axis of one of the polarizing plates. Therefore, the alignment direction of the liquid crystal molecules under generation of no electric field in the liquid crystal layer 5 coincides with the polarizing axis direction of the polarizing plate, and a dark (black) display (normally black mode) is obtained. When a voltage (e.g., 5 V) corresponding to an image signal is applied to the pixel electrodes 13, a lateral electric field substantially parallel to the substrate surface is generated in the liquid crystal layer 5, and the alignment of the liquid crystal molecules is rotated by a predetermined angle within a plane substantially parallel to the substrate surface. Thereby, the light transmittance is modulated according to the angle, and a bright (white) display with a predetermined gradation level is obtained.

For example, assuming that the alignment direction of the liquid crystal molecules defines an acute angle with respect to the extending direction of the scanning lines 16 under application of no voltage, then, in the third embodiment, since the strip-shaped electrode portions 13a and 21a of the electrodes 13 and 21 are arranged vertical to the scanning lines 16, a lateral electric field generated in a direction vertical to the strip-shaped electrode portions 13a and 21a would be parallel to the extending direction of the scanning lines 16. In this case, the angle defined between the alignment direction of the liquid crystal molecules under application of no voltage and the direction of the lateral electric field is an acute angle, and the liquid crystal molecules in the liquid crystal layer 5 will be aligned in the direction parallel to the lateral electric field when the lateral electric field is applied. Therefore, no liquid crystal alignment disorder (called disclination) occurs.

In the liquid crystal device 1 of the third embodiment, the strip-shaped electrode portions 13a and 21a of the pixel electrodes 13 and the common electrodes 21 are arranged parallel to each other, and a uniform lateral electric field is generated in the liquid crystal layer 5 at a portion where the electrode portions 13a and 21a face each other. Thus, a normal bright display is obtained. On the other hand, a uniform lateral electric field is not generated at a portion just above the joint portions 13b and 21b of the electrodes 13 and 21 and at a portion where the strip-shaped electrode portions 13a and 21a face the joint portions 13b and 21b, resulting in a low light transmittance during bright display. According to the liquid crystal device 1 of the third embodiment, however, the joint portions 13b of the pixel electrodes 13 and the joint portions 21b of the common electrodes 21 are alternately arranged in the extending direction of the scanning lines 16, and a widthwise portion of the joint portions 13b of the pixel electrodes 13 and a widthwise portion of the joint portions 21b of the common electrodes 21 are aligned in a line, thereby reducing the size of a region with a low transmittance over the related art. Therefore, the aperture ratio can be increased. A liquid crystal device capable of achieving a bright display can thus be realized.

In the third embodiment, the joint portions 13b and 21b of the pixel electrodes 13 and the common electrodes 21 are placed so as to overlap the scanning lines 16. Since a region where the scanning lines 16 are located is a region where light is blocked by the black matrix 58, the reduction of the aperture ratio can be minimized. Further, the pixel electrodes 13 and the common electrodes 21 are arranged so as to be offset with respect to each other by a quarter pitch in the extending direction of the scanning lines 16, and the corners of the connection portions at which the strip-shaped electrode portions 13a and 21a and the joint portions 13b and 21b are connected are formed obliquely. Therefore, the joint portions of one of the pixel electrodes 13 or the common electrodes 21 can be relatively easily placed between the joint portions of the other electrodes.

According to the third embodiment, the common electrodes 13 and the capacitor lines 17 are electrically connected through the contact holes 56. Therefore, even if the common electrodes 13 are separated for each of the pixels 20, a fixed potential can be supplied to the common electrodes 13 via the capacitor lines 17. Since the capacitor lines 17 through which a fixed potential is supplied are effectively utilized, no other lines are required for supplying a common potential. Therefore, the aperture ratio can be improved.

Fourth Embodiment

A fourth embodiment of the invention will now be described with reference to FIG. 12.

The basic structure of a liquid crystal device of the fourth embodiment is similar to that of the third embodiment, except for the structure of common electrodes. Only a portion different from that of the third embodiment will be described with reference to a plan view shown in FIG. 12, and a description of the other portions, which are common to those of the third embodiment, is omitted. In FIG. 12, components common to those shown in FIG. 11 are represented by the same reference numerals.

Figure 12:
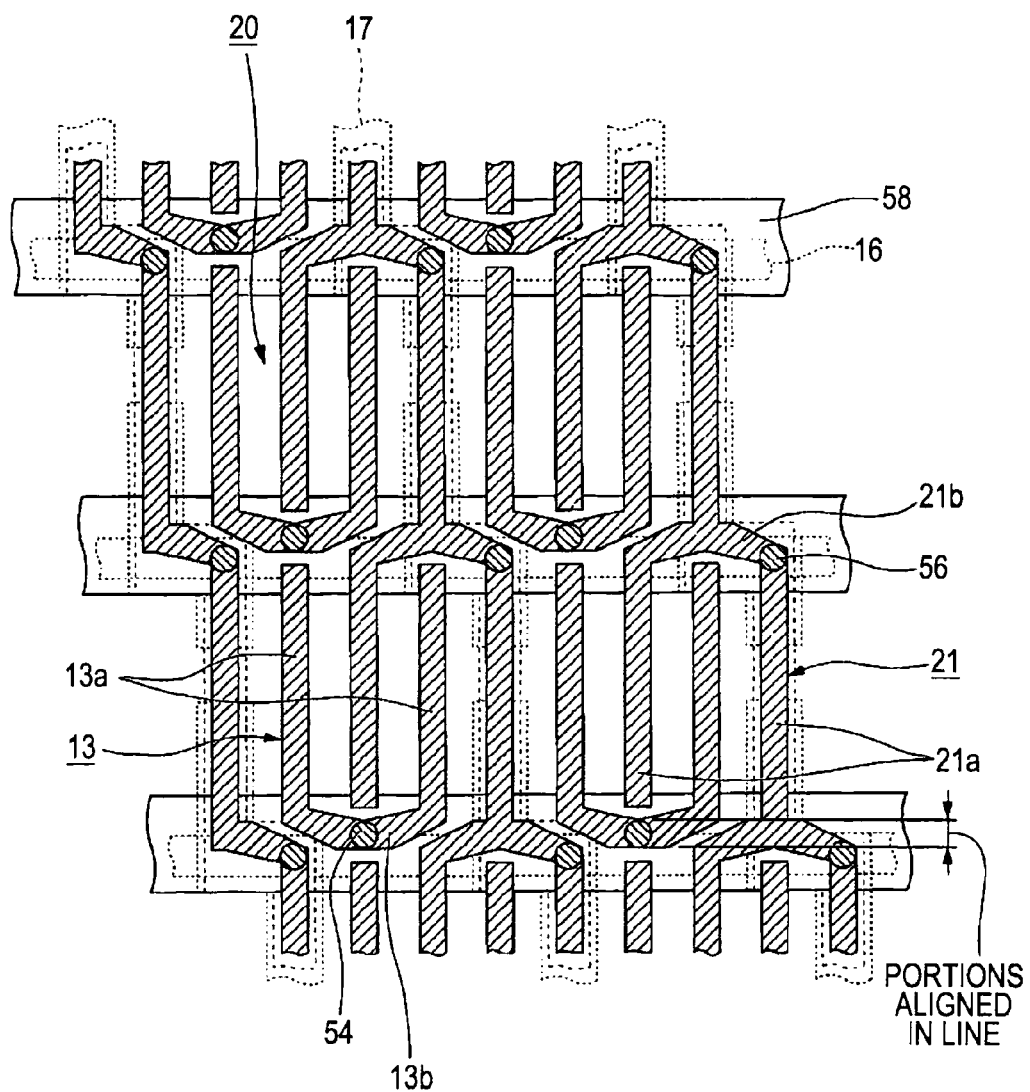
FIG. 12 is a plan view of pixels on a TFT array substrate of a liquid crystal device according to a fourth embodiment of the invention, showing components in upper layers thereof.

In the fourth embodiment, as shown in FIG. 12, one of the two strip-shaped electrode portions 21a (in the example shown in FIG. 12, the strip-shaped electrode portion 21a at the right) of each of the common electrodes 21 extends from the open end thereof, and is connected to the joint portion 21b of the common electrode 21 that is adjacent thereto in the extending direction of the data lines 15. In the fourth embodiment, therefore, unlike the third embodiment, the common electrodes 21 are not independent for each pixel, and a plurality of the common electrodes 21 which are associated with a plurality of the pixels 20 which are arranged in the extending direction of the data lines 15 are formed into an integrated continuous electrode pattern. The electrode pattern is drawn on the TFT array substrate 2 to the outside of the image display area, and is fixed at a common potential. The remaining components, such as the pixel electrodes 13, are the same as those of the third embodiment.

According to the structure of the fourth embodiment, the plurality of common electrodes 21 arranged in the extending direction of the data lines 15 are electrically connected, thereby stably supplying a common potential to the plurality of common electrodes 21. In the fourth embodiment, in particular, the above-described structure and the structure described above in the first embodiment in which the common electrodes 21 and the capacitor lines 17 are electrically connected through the contact holes 56 so that a common potential can be supplied via the capacitor lines 17 are used in combination. Therefore, even if one of the connection structures fails, the other connection structure can be used to establish an electrical connection, thereby realizing a high-reliability liquid crystal device with a redundant structure.

Fifth Embodiment

A fifth embodiment of the invention will be described hereinafter with reference to FIG. 13.

The basic structure of a liquid crystal device of the fifth embodiment is similar to that of the third embodiment, except for the arrangement of pixels. Only a portion different from that of the third embodiment will be described with reference to a plan view shown in FIG. 13, and a description of the other portions, which are common to those of the third embodiment, is omitted. In FIG. 13, components common to those shown in FIG. 11 are represented by the same reference numerals.

Figure 13:
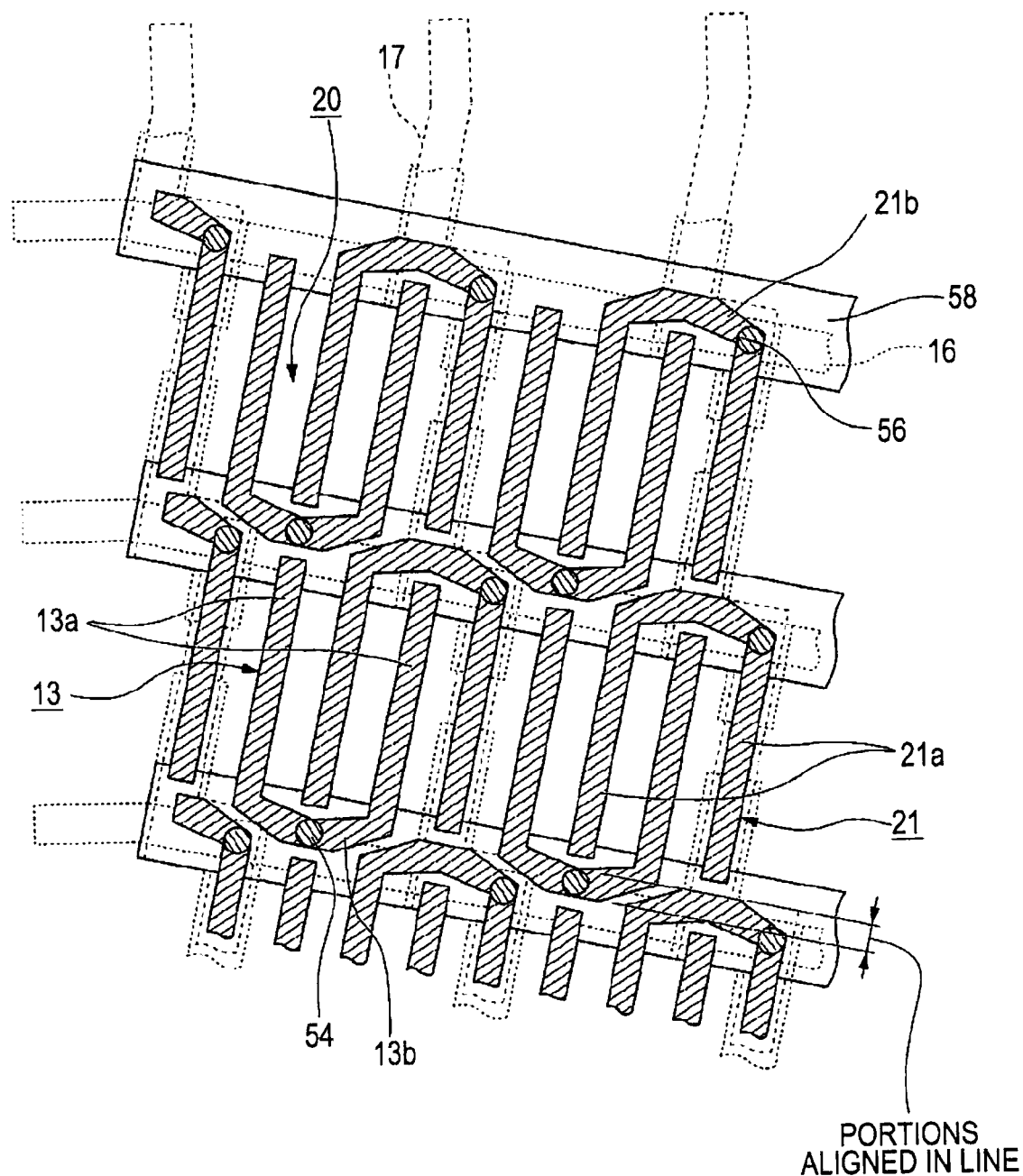
FIG. 13 is a plan view of pixels on a TFT array substrate of a liquid crystal device according to a fifth embodiment of the invention, showing components in upper layers thereof.

In the fifth embodiment, as shown in FIG. 13, the scanning lines 16 are inclined with respect to a horizontal direction (the horizontal direction H shown in FIG. 1) of a display area (the display area R shown in FIG. 1), and the data lines 15 are inclined with respect to a vertical direction (the vertical direction V shown in FIG. 1) of the display area. The data lines 15 are bent at intersections with the scanning lines 16. Therefore, a plurality of the pixels 20 which are arranged in the extending direction of the scanning lines 16 are inclined with respect to the horizontal direction of the display area, and a plurality of the pixels 20 which are arranged in the extending direction of the data lines 15 are inclined with respect to the vertical direction of the display area.

In the structure of the third and fourth embodiments, since the plurality of pixels 20 are offset with respect to each other in the extending direction of the scanning lines 16, there is a drawback in that a straight line might be displayed obliquely when a straight line extending in the horizontal direction of the screen (display area) is displayed or when a straight line extending in the vertical direction of the screen is displayed. According to the fifth embodiment, a plurality of the pixels 20 which are arranged in the extending direction of the scanning lines 16 are inclined with respect to the horizontal direction of the screen, and a plurality of the pixels which are arranged in the extending direction of the data lines 15 are inclined with respect to the vertical direction of the screen. Therefore, the straight line can be prevented from being displayed obliquely even though the straight line is displayed as a slightly zigzag line to ensure high representation of the straight line.

Projector

Figure 14:
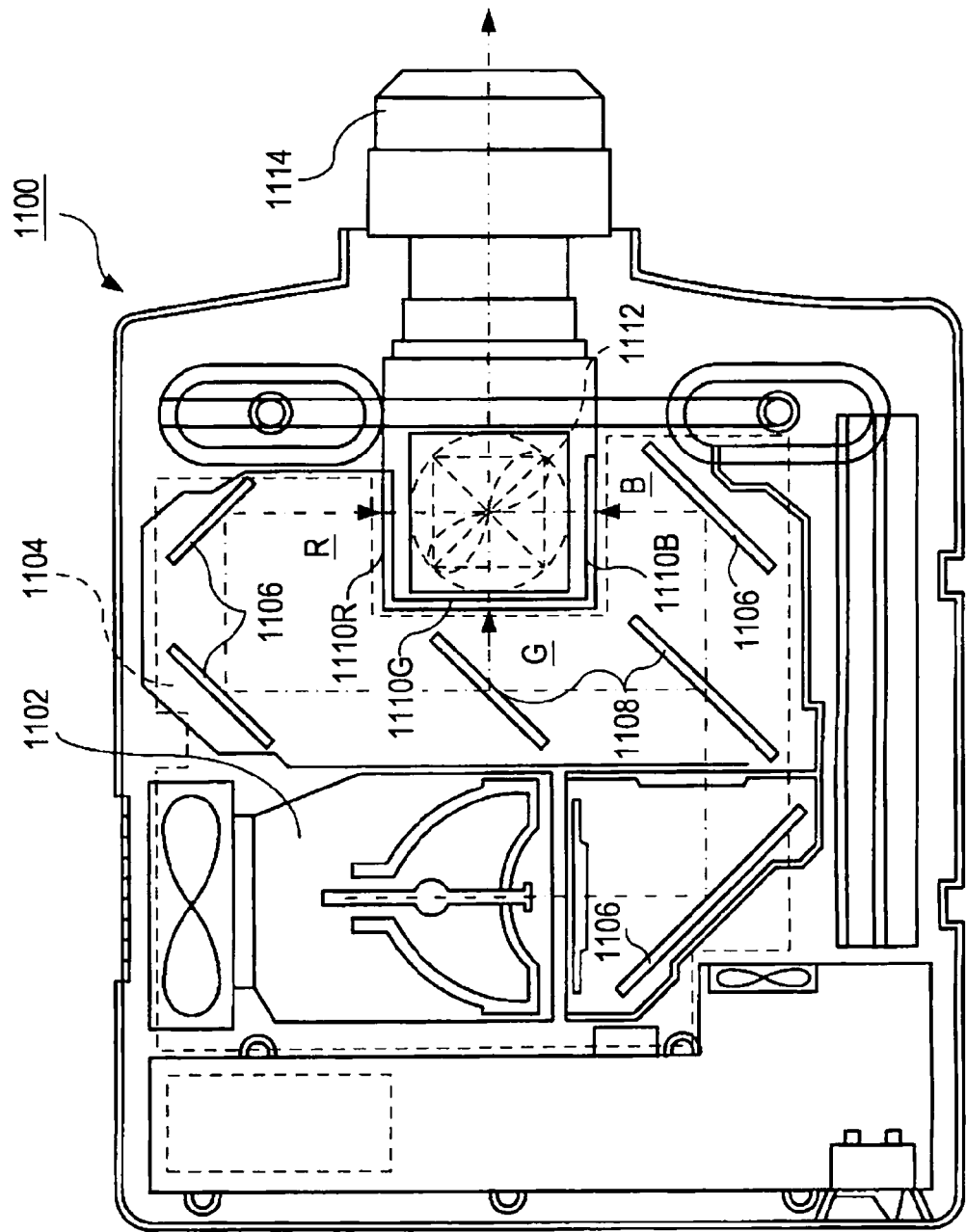
FIG. 14 is a schematic diagram showing an example of a projector according to the invention.
Figure 15:
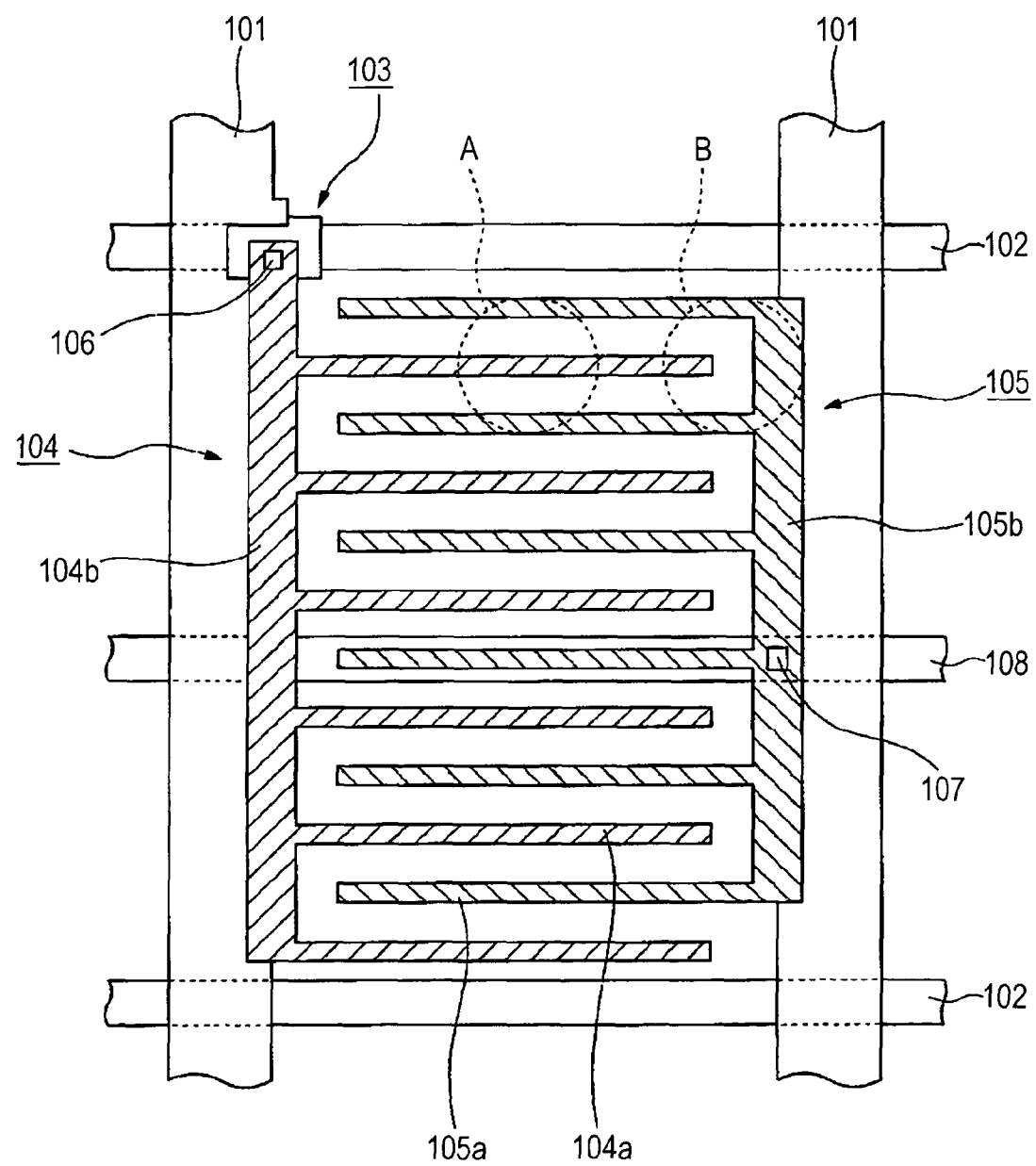
FIG. 15 is a plan view showing an example electrode pattern of a lateral-electric-field liquid crystal device of the related art.

A projector including the liquid crystal device 1 of the embodiments described above as a light valve will now be described. FIG. 14 is a plan view showing an example structure of a projector 1100 according to an embodiment of the invention. As shown in FIG. 14, the projector 1100 includes a lamp unit 1102 including a white light source such as a halogen lamp. Projection light emitted from the lamp unit 1102 is separated into light components R, G, and B of three primary colors, i.e., red (R), green (G), and blue (B), by four mirrors 1106 and two dichroic mirrors 1108 provided in a light guide 1104. The light components R, G, and B are directed to liquid crystal panels 1110R, 1110B, and 1110G serving as light valves, respectively.

The structure of the liquid crystal panels 1110R, 1110B, and 1110G is equivalent to that of the liquid crystal device 1 described above, and the liquid crystal panels 1110R, 1110B, and 1110G are driven by primary color signals R, G, and B supplied from an image signal processing circuit, respectively. The light components R, G, and B modulated by the liquid crystal panels 1110R, 1110B, and 1110G enter a dichroic prism 1112 from three directions. In the dichroic prism 1112, the light components R and B are refracted at 90 degrees while the light component G advances straight. After images of the respective colors are combined, a color image is projected onto a screen or the like through a projector lens 1114.

According to the embodiment, the liquid crystal device 1 of the embodiments described above having a high pixel aperture ratio is used as a light valve, thereby achieving a projector capable of performing a bright display.

The technical scope of the invention is not limited to the embodiments described above, and a variety of modifications can be made without departing from the scope of the invention. In the embodiments described above, strip-shaped electrode portions of each electrode extend in a direction in which the data lines extend, and a joint portion of the electrode and a corresponding one of the scanning lines overlap each other. For example, this arrangement may be rotated by 90°, and the strip-shaped electrode portions may extend in a direction in which the scanning lines extend and the joint portion and the data line may overlap each other so that the joint portions of the respective electrodes may be aligned in a line along the data lines.

In the embodiments described above, a connection portion at which the strip-shaped electrode portions and the joint portion are connected is bent twice so as to define an obtuse angle to allow the joint portions of the pixel electrodes or the common electrodes to be easily placed between the joint portions of the other electrodes. Instead of the above structure, the corners of a connection portion at which the strip-shaped electrode portions and the joint portions are connected may be curved. Alternatively, in addition to the corners of a connection portion at which the strip-shaped electrode portions and the joint portions are connected, the joint portions may be entirely bent at the center thereof to the extent that the aperture ratio is not greatly reduced. Further, in the liquid crystal device of the embodiments described above, since the pixel pitch is as small as approximately 12 μm, only two strip-shaped electrode portions of each electrode are required. However, the number and size of strip-shaped electrode portions may be changed as necessary according to the pixel pitch. Other specific components, except for pixel electrodes and common electrodes, can be changed as necessary.

EXAMPLES

The inventors conducted a simulation to demonstrate an effect of the improved aperture ratio according to the invention. A result of the simulation will now be described.

Figure 8A:
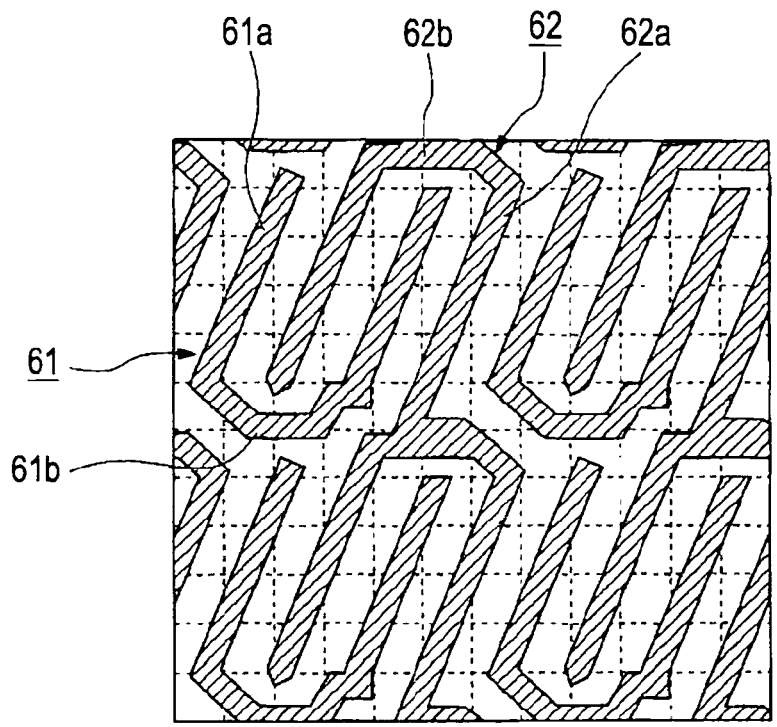
FIGS. 8A and 8B are diagrams showing an electrode pattern and a result of a simulation of improvement effects of the pixel aperture ratio, respectively, using a liquid crystal device according to Example 1 of the invention.

In Example 1, a negative liquid crystal with an dielectric constant anisotropy $\Delta\in$ of −5.5 and a refractive index anisotropy of $\Delta n$ of 0.14 was used. As shown in FIG. 8A, an electrode arrangement including pixel electrodes 61 that are independent from each other, and common electrodes 62 that are patterned so as to be connected to each others which is similar to that of the second embodiment, was used. The pitch of pixels was 12 μm×12 μm, the width of strip-shaped electrode portions 61a and 62a was 1 μm, and the pitch of the strip-shaped electrode portions 61a and 62a was 3 μm.

Figure 9A:
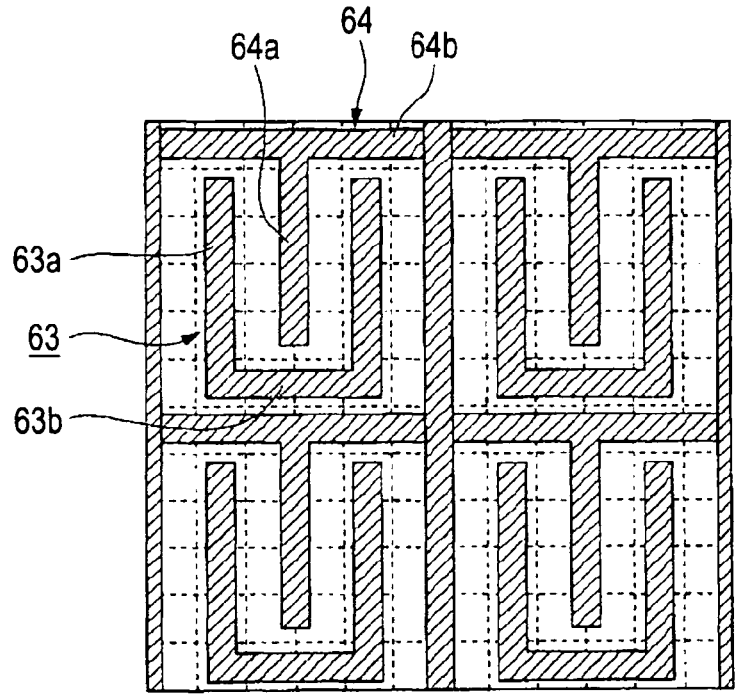
FIGS. 9A and 9B are diagrams showing an electrode pattern and a result of a simulation of improvement effects of the pixel aperture ratio, respectively, using a liquid crystal device according to Comparative Example 1.

In Comparative Example 1, conditions similar to those of Example 1, except for an electrode arrangement shown in FIG. 9A, were used. Referring to FIG. 9A, the electrode arrangement includes pixel electrodes 63 and common electrodes 64.

Figure 8B:
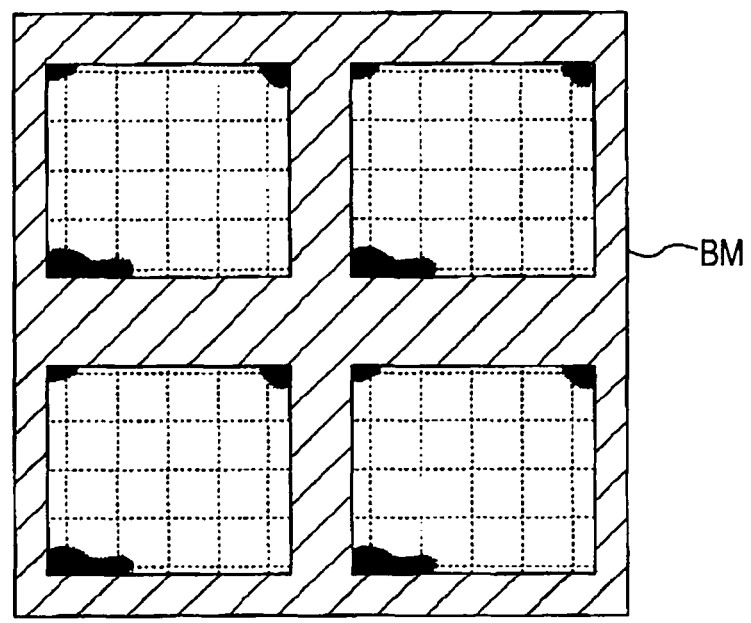
Figure 9B:
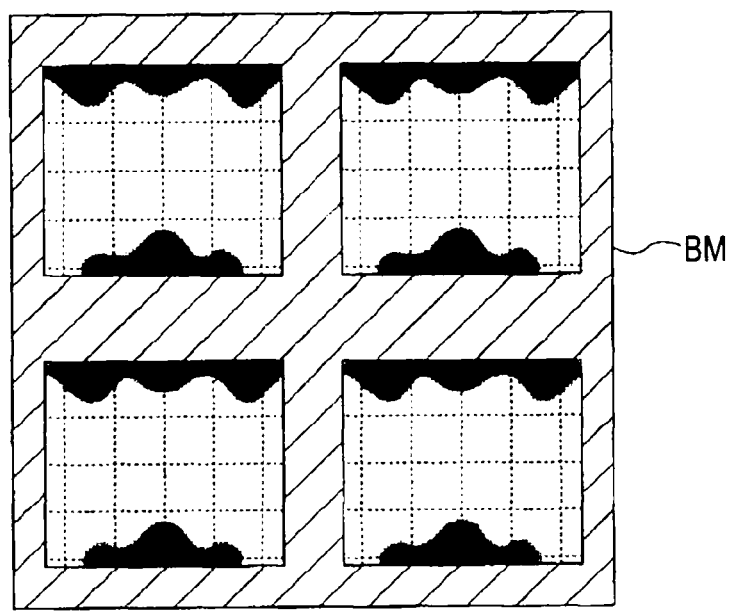

Results of a simulation of transmittance distribution when a bright display was conducted by applying a voltage of 5 V between the pixel electrodes and the common electrodes are shown in FIGS. 8B and 9B. FIG. 8B shows the result of the simulation in Example 1, and FIG. 9B shows the result of the simulation in Comparative Example 1. It was assumed in this simulation that a portion corresponding to the data lines and a portion corresponding to the scanning lines were shielded from light using a black matrix BM with a width of 2 μm and a width of 4 μm, respectively.

In Comparative Example 1, as can be seen from FIG. 9B, a dark (low-light-transmittance) region was greatly expanded toward the inside of a region to be brightly displayed within the black matrix BM. The dark region correspond to a region where the strip-shaped electrode portions 63a and 64a of the electrodes 63 and 64 face joint portions 63b and 64b of the electrodes 63 and 64 shown in FIG. 9A. In Example 1, on the other hand, as can be seen from FIG. 8B, the size of an observed dark region expanded toward the inside of a region to be brightly displayed was significantly smaller than that of Comparative Example 1. According to the invention, therefore, it was found that the effective pixel aperture ratio could be improved. Further, the inventors actually produced a model of a liquid crystal device of the invention, and measured the pixel aperture ratio. The measurement result matched the result of the simulation above.

What is claimed is:

1. A liquid crystal device comprising:
a pair of substrates facing each other; and
a liquid crystal layer sandwiched between the pair of substrates,
one of the pair of substrates including
data lines,
scanning lines,
the data lines and the scanning lines intersecting each other,
pixels arranged in a matrix,
at least one U-shaped first electrode, and
at least one U-shaped second electrode that applies an electric field generated between the first electrode and the second electrode to the liquid crystal layer,
each of the first electrode and the second electrode including
a first electrode portion and a second electrode portion, and
a joint portion for connecting the first and second electrode portions, the first electrode portion and second electrode portion extending from the joint portion such that the first electrode portion is parallel to the second electrode portion,
wherein at least a portion of the joint portion of the first electrode and at least a portion of the joint portion of the second electrode are arranged so as to overlap one line of the data lines or the scanning lines, and are aligned in a line extending along the one line of at least the data lines or the scanning lines.

2. The liquid crystal device according to claim 1, wherein the electrode portions of the first electrode and the electrode portions of the second electrode cross obliquely to the data lines or the scanning lines.

3. The liquid crystal device according to claim 1, wherein the first and second electrode portions of the first electrode are arranged so as to extend across adjacent two of the pixels.

4. The liquid crystal device according to claim 1, wherein a portion of at least the joint portion of the first electrode or the joint portion of the second electrode is formed so as to narrow from the first and second electrode portions thereof.

5. The liquid crystal device according to claim 1, wherein a plurality of the first electrodes which are adjacent in a direction in which the data lines or the scanning lines extend is formed into a continuous electrode pattern.

6. The liquid crystal device according to claim 1, wherein the one of the pair of substrates further includes a common potential line to which a common potential is supplied, and
the first electrode and the common potential line are electrically connected through a contact hole that is formed for each of the pixels.

7. The liquid crystal device according to claim 1, wherein at least one of the first electrode and the second electrode is formed of a transparent electrically conductive material.

8. A projector comprising:
a light source;

a light modulator that modulates light emitted from the light source, the light modulator including the liquid crystal device according to claim 1; and a projection unit that projects the light modulated by the light modulator.

9. The liquid crystal device according to claim 1, further comprising a plurality of contact holes, the plurality of contact holes being formed on the joint portion of each of the first electrode and second electrode, wherein at least a portion of a contact hole of the first electrode and at least a portion of a contact hole of the second electrode are arranged so as to overlap the one line of at least the data lines or the scanning lines.

10. The liquid crystal device according to claim 9, wherein the portion of the contact hole of the first electrode and the portion of the contact hole of the second electrode are aligned in the line extending along the one line of at least the data lines or the scanning lines.

* * * * *